(12) United States Patent
Vertegaal et al.

(10) Patent No.: US 12,271,519 B2
(45) Date of Patent: Apr. 8, 2025

(54) SYSTEMS, METHODS, AND MEDIA FOR EYE TRACKING USING STATISTICALLY DERIVED LINEAR FUNCTIONS

(71) Applicant: HUAWEI TECHNOLOGIES., LTD., Shenzhen (CN)

(72) Inventors: Roel Vertegaal, Perth Road Village (CA); Sean Braley, Mount Albert (CA); Hisham El-Halabi, Brampton (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 254 days.

(21) Appl. No.: 17/834,632

(22) Filed: Jun. 7, 2022

(65) Prior Publication Data

US 2022/0391012 A1 Dec. 8, 2022

Related U.S. Application Data

(60) Provisional application No. 63/208,432, filed on Jun. 8, 2021.

(51) Int. Cl.
*G06F 3/01* (2006.01)
*G06T 7/73* (2017.01)
*H04N 23/56* (2023.01)

(52) U.S. Cl.
CPC ............. *G06F 3/013* (2013.01); *G06T 7/73* (2017.01); *H04N 23/56* (2023.01); *G06T 2207/10048* (2013.01); *G06T 2207/30201* (2013.01); *G06T 2207/30244* (2013.01); *G06T 2207/30268* (2013.01)

(58) Field of Classification Search
CPC . G06F 3/013; G06T 7/73; G06T 2207/10048; G06T 2207/30201; G06T 2207/30244; G06T 2207/30268; H04N 23/56
See application file for complete search history.

(56) References Cited

U.S. PATENT DOCUMENTS

| 3,462,604 | A | 8/1969 | Mason et al. |
| 7,963,652 | B2 | 6/2011 | Vertegaal et al. |
| 9,965,860 | B2 * | 5/2018 | Nguyen ................ G06T 7/20 |

(Continued)

OTHER PUBLICATIONS

D. H. Yoo, J. H. Kim, B. R. Lee, and M. J. Chung, "Non-contact eye gaze tracking system by mapping of corneal reflections," in Proc of Fifth IEEE International Conference on Automatic Face and Gesture Recognition 2002.

(Continued)

*Primary Examiner* — James T Boylan

(57) ABSTRACT

Devices, methods, and processor-readable media for eye tracking using statistically derived linear functions are described. Two simple linear functions may be identified, one for the horizontal and one for the vertical, with two parameters each, that fully correct for horizontal and vertical estimation bias error in a cross-ratio gaze estimation method. An implicit calibration step may be performed that finds the parameters of said linear functions statistically based on undirected user point of gaze measurements that indicate the extremities of the error between gaze vectors and glint vectors. Various hardware devices are described that may implement the novel eye tracking techniques.

23 Claims, 14 Drawing Sheets

(56) References Cited

U.S. PATENT DOCUMENTS

| | | | | |
|---|---|---|---|---|
| 2015/0277553 | A1* | 10/2015 | Zhang | G06V 40/19 382/165 |
| 2016/0005176 | A1* | 1/2016 | Nguyen | G06F 3/013 382/103 |
| 2017/0105619 | A1* | 4/2017 | Ebisawa | A61B 3/0025 |
| 2019/0172222 | A1* | 6/2019 | Ebisawa | G06T 7/593 |
| 2020/0192473 | A1* | 6/2020 | Wang | G06F 3/0304 |

OTHER PUBLICATIONS

F.L. Coutinho and C.H. Morimoto, "Free head motion eye gaze tracking using a single camera and multiple light sources," Brazilian Symposium on Computer Graphics and Image Processing 2006.

J. J. Kang, E. D. Guestrin, W. J. Maclean, and M. Eizenman, "Simplifying the cross-ratios method of point-of-gaze estimation," in Proc. 30th Can. Med. Biol. Eng. Conf 2007.

C. Morimoto, Coutinho, D. Hansen. Screen-Light Decomposition Framework for Point-of-Gaze Estimation Using a Single Uncalibrated Camera and Multiple Light Sources. In Journal of Mathematical Imaging and Vision 2020.

D.H. Chang, G.O. Waring. The subject-fixated coaxially sighted corneal light reflex: a clinical marker for centration of refractive treatments and devices. Am J Ophthalmol. 2014.

J. Kang, M. Eizenman, E. Guestrin and E. Eizenman, "Investigation of the Cross-Ratios Method for Point of Gaze Estimation," In IEEE Transactions on Biomedical Engineering, vol. 55., No. 9 2008.

B.Brousseau 1,*, J. Rose and M. Eizenman. Hybrid Eye-Tracking on a Smartphone with CNN Feature Extraction and an Infrared 3D Model. Sensors 2020.

Daniel Cheng. Calibration-free Eye Tracking. MSC Thesis, Queen's University 2005.

C. Fedtke, F. Manns, and A. Ho, "The entrance pupil of the human eye: a three-dimensional model as a function of viewing angle," Opt. Express 18.

K. Wang and Q. Ji. 3D gaze estimation without explicit personal calibration. Pattern Recognition 79 2018.

E. Guestrin, M. Eizenman, J. Kang, and E. Eizenman. 2008. Analysis of subject-dependent point-of-gaze estimation bias in the cross-ratios method. In Proceedings of the 2008 symposium on Eye tracking research & applications (ETRA 08). Association for Computing Machinery, New York, NY, USA 2008.

D. H. Yoo and M. J. Chung. A novel non-intrusive eye gaze estimation using cross-ratio under large head motion. Computer Vision and Image Understanding 98 2005.

* cited by examiner

SYSTEMS, METHODS, AND MEDIA FOR EYE TRACKING USING STATISTICALLY DERIVED LINEAR FUNCTIONS

RELATED APPLICATION DATA

The present disclosure claims priority from U.S. provisional patent application No. 63/208,432, entitled "SYSTEMS, METHODS, AND MEDIA FOR EYE TRACKING USING STATISTICALLY DERIVED LINEAR FUNCTIONS", filed Jun. 8, 2021, the entirety of which is hereby incorporated by reference.

FIELD

The present disclosure relates to eye tracking, and in particular to systems, methods, and processor-readable media for eye tracking using statistically derived linear functions.

BACKGROUND

Commercial video-based eye trackers have existed since the 1980s. Most are based on the principle of corneal glint tracking. In this method, an infrared, thus invisible, light source is mounted near the camera lens. The camera takes images of the eyes of the user, determining the center of the pupil through computer vision techniques known to those skilled in the art. The center of the reflection on the cornea of the light source near the camera lens is also determined.

FIG. 1A (prior art) shows an anatomical model of an eye 2, showing the eyeball 111, pupil 8, fovea 4, and cornea 110. (It will be appreciated that the cornea 110 is shown in FIG. 1A as a complete circle, but in reality is only a substantially spherical surface extending from the front of the eyeball 111 as shown in FIG. 1B.) FIG. 1B is a detailed view of the corneal portion of FIG. 1A, indicating a number of parameters that affect eye tracking according to example embodiments described herein, but that may not be fully appreciated by existing approaches to eye tracking. The axis extending from the center of the camera lens is known as the camera optical axis 107. When the light source is mounted near or on the camera optical axis 107, the reflection on the cornea 110, known as glint or first Purkinje image 102, indicates the origin, i.e., the (x=0,y=0) coordinate, of the camera's imaging space. As such, any deviation of the pupil center 103 relative to the glint 102 is indicative of a movement of the eye 2 (a rotation of the eyeball 111) towards a target outside the camera optical axis 107. By calculating the vector between the glint 102 and the pupil center 103, commercial video-based eye trackers derive a gaze vector (in the camera or eye coordinate system) that can be related to a Point of Gaze (PoG) coordinate in the real-world coordinate system (e.g., a display).

However, the mapping of the pupil center to a real-world (display) coordinate system is not straightforward. Firstly, according to [D. H. Chang, G. O. Waring. The subject-fixated coaxially sighted corneal light reflex: a clinical marker for centration of refractive treatments and devices. Am J Ophthalmol. 2014;158: 863-874, hereinafter "Chang"], the optical system of the eye is not symmetrical in that the optical axis of the eye 109 (i.e., a line between the center of the cornea 6 and the center of the pupil 103, also known as the pupillary axis 109) is not aligned with the vision center of the retina, i.e. the fovea 4. Horizontally, the fovea 4 is offset by about 5 degrees of arc to the side opposite the nose (temporal). Vertically, the fovea 4 is offset by about 1-2 degrees of arc to the bottom (inferior). These angles, generally known as kappa, vary between individuals. It means that the line-of-sight, typically but not always corresponding to the visual axis 108 (i.e., a line between the fovea 4 and the spherical center C 106 of the cornea 110), is also offset from the optical or pupillary axis 109 by the same degree. More colloquially, humans do not point their pupil center 103 directly at the object they are looking at, rather, they use an offset visual axis 108 originating in and intersecting the optical axis 109 in the posterior nodal point 106, substantially close to the spherical center C 106 of the cornea, to aim the image at the fovea 4. (This disclosure refers to posterior nodal point 106 and corneal spherical center C 106 interchangeably and assumes their equivalence for reasons of simplicity.) The visual axis 108 intersects the plane of the pupil 8 to the nasal side of the pupil center 103 horizontally, and superior to the pupil center 103 vertically. The visual axis 108, slightly refracted by the crystalline lens (not shown) and the corneal surface 110, produces a line of sight (see [Chang] for more specific definitions) that connects the fovea 4 or central vision with the Point of Gaze (PoG) in the real world. The angle lambda 112 refers to the angle between the line-of-sight 108 and the optical/pupillary axis 109. While this angle lambda 112 is slightly bigger than kappa due to refraction, it is substantially aligned with kappa, and this specification will refer to lambda and kappa interchangeably and assume their equivalence for reasons of simplicity. The offset caused by lambda 112, at 1-2 degrees vertical, ±5 degrees horizontal, represents a significant source of error that needs to be taken into account when calibrating an eye tracker to real-world coordinates. Even when a user looks straight at the origin (0,0), i.e. the user's visual axis 108 aligns with the center of the camera lens on the camera optical axis 107, with a light source mounted at this exact location 107, their pupil center 103 will be offset from the corneal reflection of said light source by an amount congruent with angle kappa 112.

The cornea 110 is a spherical structure that protrudes from the eyeball 111. The eye 2, and thus the corneal sphere, rotates around the center of the eyeball 111. The cornea 110 has a radius that describes the location of its spherical center C 106, averaging 7.8 mm in the human population. In most eye trackers, the corneal surface 110 acts as an important reference point because it is where the glint 102 is reflected, with the cornea 110 acting as a convex mirror with a center C 106 at 7.8 mm from the surface, and a focal point 100 at half radius (3.9 mm on average). The glint 102 is reflected as a virtual image 101 near the focal point 100 of the corneal sphere. The reflection visible to the camera occurs at the intersection 102 between the cornea 110 and the line from this virtual image 101 to the center of the camera 107. At small angles, the location of the glint can be approximated as the intersection between the corneal surface 110 and a line that bisects the line connecting the spherical center of the cornea C 106 with the center of the camera 107 and the visual axis 108. As such, the glint is indicative of the visual axis 108, which itself is not visible, however, it tracks this axis at approximately half angle to the camera optical axis 107. This is a second source of error that needs to be accounted for in calibration when the point of gaze is substantially away from the center of the camera lens.

The third source of error is due to refractive properties of the cornea 110. Especially at larger angles, the pupil center 103 is projected towards the corneal surface 110 away from the actual pupil plane 8. This virtual pupil center 104 is projected on the intersection of the optical axis 109 with a ray 113 from the camera that intersects with the corneal surface 110 at the refraction point 105. The refraction point 105 is where this ray 113 from the camera meets the center of the pupil 103 after refraction (inward bending) along path 114 by the corneal surface 110 (which has a mean refractive index of approximately 1.38). Not only does this result in the pupil being shifting outward from the point of view of the camera, but also the anterior side of the pupil's edge is shifted more than the interior, due to the refraction points for those elements of the pupil entering the cornea at different tangents to the corneal surface 110. At extreme angles this can lead to an asymmetrical pupil shape that is akin to a limagon, as described by [C. Fedtke, F. Manns, and A. Ho, "The entrance pupil of the human eye: a three-dimensional model as a function of viewing angle," Opt. Express 18, 22364-22376 (2010)]. When these edges are used to determine the pupil center, this can lead to an even further apparent shift away from its original location.

The fourth source of error is variations in the curvature of the cornea 110, or corneal radius, which affects both the convex mirror properties and thus the glint location, as well as the tangent and thus refraction angle at the refraction point 105, and thus the virtual pupil location 104. Corneal curvature can vary across the surface of the cornea 110, and can vary between individual eyes.

The fifth and final significant source of error is the distance from the corneal surface 110 to the pupil plane 8, known as the Anterior Chamber Depth (ACD). On average, it is located close to but not at the focal point 100 of the corneal mirror, at about 3 mm distance to the corneal surface 110.

Without refraction, and assuming an ACD coinciding with the pupil plane 8, the only error between the glint 102 and the optical axis 109 when looking away from the camera center 107 would be that caused by kappa. However, in practice, the distance between the glint 102 and pupil center 103, as observed from the camera, can vary with said 5 parameters of the eye. It will be appreciated that the pupil center 103 and thus virtual pupil center 104 can also vary with lighting conditions that affect not just the size of the pupil 8 but also its symmetry. As such, most eye trackers are calibrated to work in specific light conditions, and calibrations often need to be repeated when light conditions change. The above variance between individuals is also a reason why the use of structured light (i.e. one or more active light sources at known world coordinates used to create reflections) is critical to high fidelity eye tracking: without an indication of at least both the visual axis 108 and optical axis 109 of the eye 2, point of gaze calculations, even with calibration, can be inaccurate. One of the benefits of using glint-based tracking is that the eye image always contains a reference point to the (0,0) camera origin in the real world, making the resulting gaze vectors robust to head movements in the real world. Also note that the offset on the x or y axis is affected by the distance of this camera origin to the coordinate system of the display.

Commercial video-based infrared eye trackers calibrate for specific user values of the above 5 parameters by asking the user to look at points in the real world, and then measuring the corresponding displacement of the gaze vector in camera coordinates. Some calibration methods involve then performing a linear or other type of regression between the gaze vector in camera coordinates and the calibration points in real world coordinates. Others use neural networks or interpolation as a means of relating gaze vectors in camera coordinates with arbitrary points of gaze in the real world. One of the downsides of a linear regression performed between gaze vectors in camera coordinates and real-world calibration points, is that the spatial relationship between glints and calibration-points may still vary with head position or display orientation, without additional linear terms relating to knowledge of head position in space, as described by [K. Wang and Q. Ji. 3D gaze estimation without explicit personal calibration. Pattern Recognition 79 (2018) 216-227 ("Wang")]. One parameter that is not accounted for by a single glint setup is the distance (z) from the head to the real-world coordinate system (typically a display).

To combat the effects of head movement, and to achieve eye tracking that relies less on explicit calibration, multiple light sources have been introduced in some approaches, typically indicating (i.e., mounted at) the extremities of the plane in the real world (e.g., the corners of a display).

FIG. 2 (prior art) shows an example of a system including a display 201 with a camera 202 and 5 light sources 200 (typically Light Emitting Diodes (LEDs)): four on the corners of the display 201 and one on the camera axis of the camera 202. This approach was first proposed by various references: [D. H. Yoo, J. H. Kim, B. R. Lee, and M. J. Chung, "Non-contact eye gaze tracking system by mapping of corneal reflections," in Proc of Fifth IEEE International Conference on Automatic Face and Gesture Recognition, pp. 94-99, 2002 ("Yoo 1"); R. Vertegaal, C. Sohn, V. Macfarlane and J. Shell. Method and Apparatus for Calibration-free Eyetracking, U.S. Pat. No. 7963652B2, Priority Date November 2003 ("Vertegaal"); and Daniel Cheng. Calibration-free Eye Tracking. MSc Thesis, Queen's University, 2005.]. The [Vertegaal] reference is hereby incorporated in its entirety herein. The rationale for the use of corner light sources is that the geometry of multiple light source reflections gives the extremities of the rectangle within which the point of gaze might lie. The geometry of its reflections also scales with the distance of the head as well as head translations to the camera, introducing further head movement tolerance. In this method, the multiple light sources 200 act as markers that reflect as glints on the cornea, providing "active" calibration markers that are always present. By measuring the gaze vector relative to each marker's reflection, then taking the ratio of vectors between the gaze vector and each reflection (hence, cross-ratio method), a point of gaze can be established by applying the ratios to the real-world coordinates of the set of markers.

However, as was already observed in [D. H. Yoo and M. J. Chung. A novel non-intrusive eye gaze estimation using cross-ratio under large head motion. Computer Vision and Image Understanding 98 (2005) 25-51 ("Yoo 2")], estimation bias errors still occur using this approach: the pupil center coordinates appear scaled (enlarged) and offset relative to the glint coordinates in the camera image, producing incorrect points of gaze when translated to the coordinates of the light sources in the real world.

FIG. 3 (prior art) illustrates this problem: pupil center measurements 300 (shown as "X" marks) on an X axis 306 and a Y axis 304 are taken while the eye looks at each of the light sources 200 around a display, producing corresponding glint locations 302 (shown as "O" marks). The image is upside down (the top of the Y axis 304 is the bottom of the display 201): The X marks 300 on the left represent the right eye pupil centers 103, the X marks 300 on the right the left eye pupil centers 103. The O marks 302 are the reflections (i.e., glints) of 2 rows of 3 light sources 200, with each O mark 302 representing a Point of Gaze at one of these light sources 200. Several methods for correcting the resulting estimation bias have been proposed. They all involve scaling the pupil center coordinates back such that they fall within the glint coordinates.

In [Yoo 2], a method is described for correcting the pupil center coordinates using a projective transform. The authors report improvements to within 1 degree of visual angle. However, their technique relies on incomplete eye models, and the authors discuss the role of pupil center detection methods but do not recognize the true cause of the pupil center shift: namely, that it is indicative of the relationship between the projection of the optical axis 109, as evidenced by the pupil center and convex mirror function that describes the glint projections of the visual axis 108. A similar technique with slightly improved results is described by [F. L. Coutinho and C. H. Morimoto, "Free head motion eye gaze tracking using a single camera and multiple light sources," Brazilian Symposium on Computer Graphics and Image Processing, pp. 171-178, 2006]. In [J. J. Kang, E. D. Guestrin, W. J. Maclean, and M. Eizenman, "Simplifying the cross-ratios method of point-of-gaze estimation," in Proc. 30th Can. Med. Biol. Eng. Conf., 2007, pp. 1-4], a homographic method of correction is described that introduces a 5th LED light source near the optical axis of the camera 107. The authors manage to further reduce the error to within a few millimeters on the display 201. The authors recognize that in order to correct the bias error, measurements need to be adjusted in camera coordinates, a coordinate space with its origin at the glint 102 indicating the camera optical axis 107. In [C. Morimoto, Coutinho, D. Hansen. Screen-Light Decomposition Framework for Point-of-Gaze Estimation Using a Single Uncalibrated Camera and Multiple Light Sources. In Journal of Mathematical Imaging and Vision 2020. 62:585-605], the authors review existing techniques for correcting the estimation bias, proposing a technique based on fitting polynomials to the calibration data. This technique has the disadvantage of being extremely computationally complex.

In [J. Kang, M. Eizenman, E. Guestrin and E. Eizenman, "Investigation of the Cross-Ratios Method for Point of Gaze Estimation," In IEEE Transactions on Biomedical Engineering, Vol 55., No 9, 2008; and E. Guestrin, M. Eizenman, J. Kang, and E. Eizenman. 2008. Analysis of subject-dependent point-of-gaze estimation bias in the cross-ratios method. In Proceedings of the 2008 symposium on Eye tracking research & applications (ETRA '08). Association for Computing Machinery, New York, NY., USA, 237-244 ("Guestrin")], the authors discuss a more complete technique for correcting the estimation bias error. The authors claim that the error is due to the discrepancy between the imaging plane of the pupil center and the imaging plane of the glints, which is near but not on the focal point of the convex corneal mirror. They show that a large contributing factor is the virtual pupil center moving toward the corneal surface due to the refractive properties of the cornea. The authors also correct for kappa 112, the angular discrepancy between the optical axis 109 and visual axis 108, and use other methods to obtain the corneal radius (indicating C 106) and the anterior chamber depth (ACD). Empirical results demonstrate a fit of their overall model with the calibration points; however, this approach has the disadvantage of having to measure horizontal and vertical kappa, as well as corneal curvature and anterior chamber depth, separately. The model is extremely complex mathematically, making it difficult to establish a simple calibration-free routine to establish the required scaling factors.

In [Wang], the authors propose a method to calibrate a model eye implicitly, solving for person dependent parameters such as kappa 112. This is based on knowledge of four constraints that limit the locations of the point of gaze. One constraint is the assumption that different gaze tracking methods should predict the same PoG. Hence, they employ a secondary gaze prediction method using infrared (IR) LEDs, claiming the difference in PoG predicted through the geometrical cross-ratios technique of [Yoo 2] should be less than a certain threshold to be acceptable. The authors apply linear regressions to determine the bias error, using the resulting linear functions to scale the pupil-glint vectors directly to real world calibration points. These equations have 3 unique regression parameters each for horizontal and vertical correction, 6 in total. Each has two inputs (the x and y components of the pupil-glint vector). Since these linear regressions are obtained from real world calibration points, their 2D mapping is not head pose nor head position invariant. To account for this, the authors use a 3D model that includes the effect of head position. This model also has 2 linear equations, leading to 6 regression parameters and 5 inputs. The resulting model has the disadvantage of having extremely high complexity.

Brousseau et al. [B. Brousseau, J. Rose and M. Eizenman. Hybrid Eye-Tracking on a Smartphone with CNN Feature Extraction and an Infrared 3D Model. Sensors 2020, 20, 543] calculate point of gaze on a smartphone using a complex model of the estimation bias that arises from using cross-ratios method. The model is described in more detail in [Guestrin]. The authors claim the estimation bias is a result of two major sources of error: the angle kappa 112 between the optical axis 109 and the visual axis 108; and the focal point of the convex mirror not being co-planar with the pupil plane 8. They derive a set of complex equations that model this error, dependent on i) the position of the IR light sources & camera, ii) the position of the eye, iii) the point of gaze and iv) person dependent factors including kappa 112, corneal curvature, and ACD. Further, obtaining these individual parameters requires calibration. This approach has disadvantages: the models are not linear, and are extremely complex.

Accordingly, it would be useful to provide an eye tracking system that overcomes one or more of the limitations of existing approaches identified above.

SUMMARY

The present disclosure describes systems, methods, and processor-readable media for eye tracking using statistically derived linear functions.

Existing approaches to eye tracking either require knowledge of the individual eye parameters or an explicit calibration procedure. In existing approaches relating to the cross-ratio method of eye tracking, scaling factors between gaze vectors and glint vectors are determined using complicated mathematical relationships that require prior knowledge of individual eye parameters.

Examples described herein may address these technical problems using one or both of two separate technical features. First, in some embodiments, a pair of simple linear functions is identified, one for the horizontal dimension and one for the vertical dimension. The linear functions have two parameters each. The linear functions may fully correct for horizontal and vertical estimation bias error in the cross-ratios method. Second, in some embodiments, an implicit calibration process may be used to statistically determine the parameters of the two linear functions based on undirected user PoG measurements indicating the extremities of the error between gaze vectors and glint vectors. Implicit calibration may be performed on an ongoing basis in some embodiments, thereby potentially adjusting to changing ambient lighting conditions or other changed conditions without requiring the user to repeatedly perform a set of calibration actions.

As used herein, "ACD" refers to Anterior Chamber Depth, i.e., the distance from the corneal surface to the pupil plane.

As used herein, "glint" refers to a first reflection of a light source on the cornea of the eye, also called a first Purkinje image.

As used herein, "virtual glint" refers to the location in 3D of the glint inside the convex mirror that is the cornea. It occurs near the focal point of the cornea at half radius.

As used herein, "virtual pupil" refers to the location in 3D of the pupil center as projected outward through refraction of the ray from the camera toward the real pupil center.

As used herein, "optical axis" and "pupillary axis" both refer to a line through the center of the optical elements of the eye, originating at the posterior nodal point near the center of the fovea, through the pupil center, intersecting the corneal curve at a right angle (i.e. normal to the corneal surface).

As used herein, "visual axis" refers to a line substantially aligned with, but slightly off of, line-of-sight. The visual axis is a line originating in the posterior nodal point near the center of the spherical center of the cornea, offset by angle kappa from the optical/pupillary axis.

As used herein, "line-of-sight" or "line of sight" refers to the visual axis under slight refraction. Line of sight deviates from the optical axis by an angle lambda that is negligibly larger than the angle kappa defining the visual axis. Lambda and kappa are assumed herein to be equal for the purpose of simplicity. As referred to herein, line of sight is treated as substantially similar to the visual axis, and lambda as substantially similar to kappa.

As used herein, "kappa" refers to the angle between the visual axis and the pupillary axis (i.e. the optical axis). Kappa is slightly smaller but substantially similar to angle lambda.

As used herein, "lambda" refers to the angle between the line of sight and the pupillary axis (i.e. the optical axis). Lambda is slightly bigger but substantially similar to angle kappa. Kappa and lambda are treated as synonymous herein for simplicity.

As used herein, "gaze vector" refers to the vector between the center of the reflection (glint) of the light source associated with the camera center (or the computed camera center) and the center of the pupil, as measured in camera coordinates.

As used herein, "glint vector" refers to the vector between the center of the reflection (glint) of the light source associated with the camera center (or the computed camera center) and the center of a reflection (glint) of a point light source in the real world, as measured in camera coordinates.

As used herein, "world coordinate" refers to a coordinate in the 3D coordinate system in the real world, for example, coordinates of light sources relative to a display or relative to a camera. A "spatial location" is a location in 3D space in the real world corresponding to a set of world coordinates.

As used herein, "Point of Gaze" (PoG) refers to the world coordinates of the intersection of the visual axis with a 2D plane in the world (e.g., a 2D electronic display).

As used herein, the terms "camera coordinate", "image location", or simply "location" unless otherwise specified, refer to a coordinate in a camera image, typically taken from an origin indicated by a glint reflecting off a light source at the center of the camera lens. Unless otherwise specified, camera coordinates are two-dimensional Cartesian coordinates (x,y), measured in pixels as the units of distance, with an origin (0,0) at a calculated camera origin location. This camera origin location, corresponding to the camera spatial location in the real world, can also be computed if the camera lens center is substantially on a line connecting two known glints, e.g., between two corners of a display wherein each corner includes a light source shown in the camera image as a reflection.

In some aspects, the present disclosure describes a method for estimating a gaze direction of an eye. An image is obtained. The image comprises a pupil of the eye, and at least one glint reflection on a surface of the eye. The pupil is associated with a pupil center location within the image. Each respective glint reflection of the at least one glint reflection is associated with a respective light source at a known light source spatial location relative to a known camera origin spatial location in the real world, and a respective glint location within the image. The image is processed to estimate a camera origin location within the image. The image is processed to estimate the pupil center location. The image is processed to estimate a pupil center vector by calculating a vector, in camera coordinates, between the camera origin location and the estimated pupil center location. The image is processed to estimate the respective glint location of each glint reflection. A scaled pupil center vector is generated by applying a mathematical function having a substantially linear component to the pupil center vector to scale the pupil center vector to a coordinate system based on the camera origin location and the at least one glint reflection.

In some examples, the pupil center vector has a horizontal component and a vertical component. The substantially linear component of the mathematical function comprises a horizontal linear function for estimating the horizontal component of the pupil center vector and a vertical linear function for estimating the vertical component of the pupil center vector. The horizontal linear function comprises the sum of: a constant horizontal component, and a horizontal scaling factor multiplied by a horizontal component of the pupil center vector. The vertical linear function comprises the sum of: a constant vertical component, and a vertical scaling factor multiplied by a vertical component of the pupil center vector.

In some examples, the constant horizontal component and constant vertical component correspond to individual angular differences between an optical axis of the eye and a visual axis of the eye.

In some examples, the at least one glint reflection comprises a first glint reflection associated with a first glint location and a first light source at a first light source spatial location, and a second glint reflection associated with a second glint location and a second light source at a second light source spatial location. Processing the image to estimate the gaze direction further comprises processing the estimated camera origin location, the scaled pupil center vector, the first glint location, and the second glint location to determine a gaze vector in camera coordinates, and a ratio of two values. The two values are the distance from the scaled pupil center vector to the first glint location, and the distance from the scaled pupil center vector to the second glint location. The ratio and the gaze vector are processed to estimate a point of gaze, in world coordinates, relative to first light source spatial location and the second light source spatial location.

In some examples, processing the image to estimate the camera origin location comprises computing the camera origin location based on: 1) a spatial location of the camera center that is known relative to the first light source spatial location and the second light source spatial location, 2) the first glint location, and 3) the second glint location.

In some examples, the image further includes a camera glint corresponding to a visible reflection on the surface of the eye of a light source located near the camera, at a camera glint location within the image. Processing the image to estimate the camera center location comprises computing the camera center location based on the camera glint location.

In some examples, the first light source spatial location defines a first corner of an electronic display. The second light source spatial location defines a second corner of the electronic display. Prior to processing the image to estimate the gaze direction, the constant horizontal component, the horizontal scaling factor, the constant vertical component, and the vertical scaling factor are computed. For each additional image of a plurality of additional images, the following are obtained: an unscaled pupil center vector in camera coordinates, and one or more glint locations in camera coordinates. It is then determined which unscaled pupil center vectors correspond to extremities of the horizontal and vertical components of a coordinate system.

In some examples, determining which unscaled pupil center vectors correspond to the extremities of the horizontal and vertical components of the coordinate system comprises several steps. The unscaled pupil center vectors are filtered to select a top subset of unscaled pupil center vectors having a vertical coordinate above a top threshold, a bottom subset of unscaled pupil center vectors having a vertical coordinate below a bottom threshold, a left subset of unscaled pupil center vectors having a horizontal coordinate left of a left threshold, and a right subset of unscaled pupil center vectors having a vertical coordinate right of a right threshold.

In some examples, determining which unscaled pupil center vectors correspond to the extremities of the horizontal and vertical components of the coordinate system further comprises excluding from the top, bottom, left, and right subsets one or more unscaled pupil center vectors having an outlier value of the horizontal or vertical coordinate.

In some examples, the top threshold, bottom threshold, left threshold, and right threshold each corresponds to a respective percentile value of the vertical or horizontal coordinate of the unscaled pupil center vectors.

In some examples, computing the constant vertical component and the vertical scaling factor comprises performing a linear regression between the unscaled pupil center vectors and one or more glint locations. The one or more glint locations represent an upper edge of the coordinate system, and a lower edge of the coordinate system.

In some examples, computing the constant horizontal component and the horizontal scaling factor comprises performing a linear regression between the unscaled pupil center vectors and one or more glint locations. The one or more glint locations represent a left edge of the coordinate system, and a right edge of the coordinate system.

In some examples, the unscaled pupil center vectors of the left eye are averaged with the unscaled pupil center vectors of the right eye prior to entry in the linear regression.

In some examples, the mathematical function is a linear function.

In some examples, the mathematical function is a tangent function having a substantially linear component. The method further comprises estimating said tangent function parameters using said linear function.

In some aspects, the present disclosure describes a non-transitory computer-readable medium storing instructions thereon to be executed by a processor device, the instructions, when executed, causing the processor device to perform the steps of one or more of the methods described above.

In some aspects, the present disclosure describes a device. The device includes a display having an upper edge, a lower edge, a left edge, and a right edge. The device includes a camera, located at a camera origin spatial location, configured to face toward an eye of a user viewing the display. The device includes at least two light sources, each light source being located co-linearly with at least one edge of the display at a known light source spatial location relative to the camera origin spatial location. The device includes a processor device, and a memory storing instructions. The instructions, when executed by the processor device, cause the device to estimate a gaze direction of an eye. An image is obtained. The image comprises a pupil of the eye, and at least one glint reflection on a surface of the eye. The pupil is associated with a pupil center location within the image. Each respective glint reflection of the at least one glint reflection is associated with a respective light source at a known light source spatial location relative to a known camera origin spatial location in the real world, and a respective glint location within the image. The image is processed to estimate a camera origin location within the image. The image is processed to estimate the pupil center location. The image is processed to estimate a pupil center vector by calculating a vector, in camera coordinates, between the camera origin location and the estimated pupil center location. The image is processed to estimate the respective glint location of each glint reflection. A scaled pupil center vector is generated by applying a mathematical function having a substantially linear component to the pupil center vector to scale the pupil center vector to a coordinate system based on the camera origin location and the at least one glint reflection.

In some examples, the device further comprises a camera light source located near the camera. The image further includes a camera glint, corresponding to a visible reflection on the surface of the eye of the camera light source, at a camera glint location within the image. Processing the image to estimate the camera origin location comprises computing the camera origin location based on the camera glint location.

In some examples, the device comprises a computing device, and the camera origin spatial location is substantially aligned with the lower edge of the display.

In some examples, the device comprises a head-mounted display (HMD) unit, the display comprises a HMD display situated in front of the eye, and the camera origin spatial location is substantially aligned with the lower edge of the display.

In some examples, the device comprises a vehicle, the display of the device comprises at least a portion of a front windscreen of the vehicle, and the camera of the device is mounted to a steering wheel of the vehicle.

In some examples, the device comprises a vehicle, the display of the device comprises at least a portion of a front windscreen of the vehicle, and the camera of the device is mounted on an interior surface of the vehicle above a steering wheel of the vehicle.

In some examples, the at least two light sources are infrared light sources placed behind a front surface of the display, the camera is an infrared camera, and the front surface of the display comprises a material that is substantially transparent to infrared light.

In some examples, the device further comprises an infrared light sensor. The instructions, when executed by the processor device, further cause the device to set power levels of the at least two light sources based on a level of environmental infrared light detected by the infrared light sensor.

In some examples, the device further comprises a plurality of additional infrared light sources located behind the display at a plurality of additional locations, each additional location being non-co-linear with any edge of the display.

In some examples, the at least two light sources are selected from the following: lasers, laser diodes, strip lights, incandescent light bulbs, a rectangular diffuser with single or multiple light sources behind it, and optical fibers that direct the light from a light source placed at a different location.

In some examples, the camera has a resolution of at least 4K.

In some examples, the camera comprises a black and white image sensor with sufficient Quantum Efficiency (QE) between 800 nm and 1000 nm wavelength.

In some examples, the device further comprises a low pass filter placed between a lens of the camera and an image sensor of the camera, only passing light with larger than 700 nm wavelength.

In some examples, the at least two light sources generate light with a wavelength between 900 nm and 1000 nm.

In some examples, the camera comprises a lens having a focal length of at least 25 mm.

In some examples, the software command comprises selecting a graphical element for input.

In some examples, selecting the graphical element for input comprises displaying a visible cursor on the display at a location based on the point of gaze on the display.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes examples in the context of a computing system or device implementing a method for eye tracking using one or more cameras and one or more light sources.

Overview of Example Eye Tracking Methods

Figure 8:
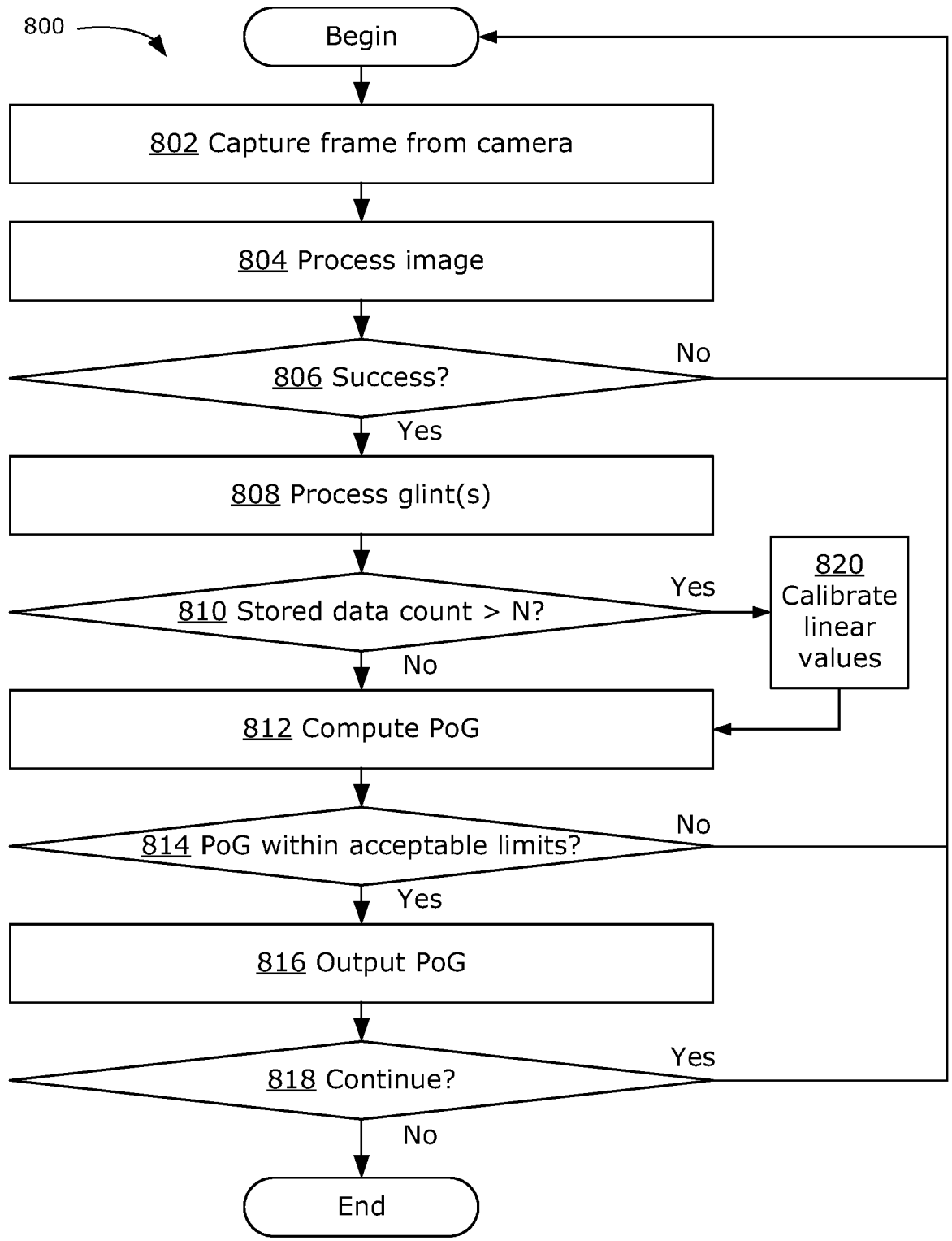
FIG. 8 is a flowchart showing operations of a method for eye tracking using statistically derived linear equations, in accordance with example embodiments described herein.

In some examples, a method is described for correcting estimation bias in a cross-ratio eye tracker using a linear function that scales the gaze vectors to the glint vectors exclusively using camera coordinates. An example embodiment of the method 800 is shown in the flowchart of FIG. 8 and described below.

Figure 3:
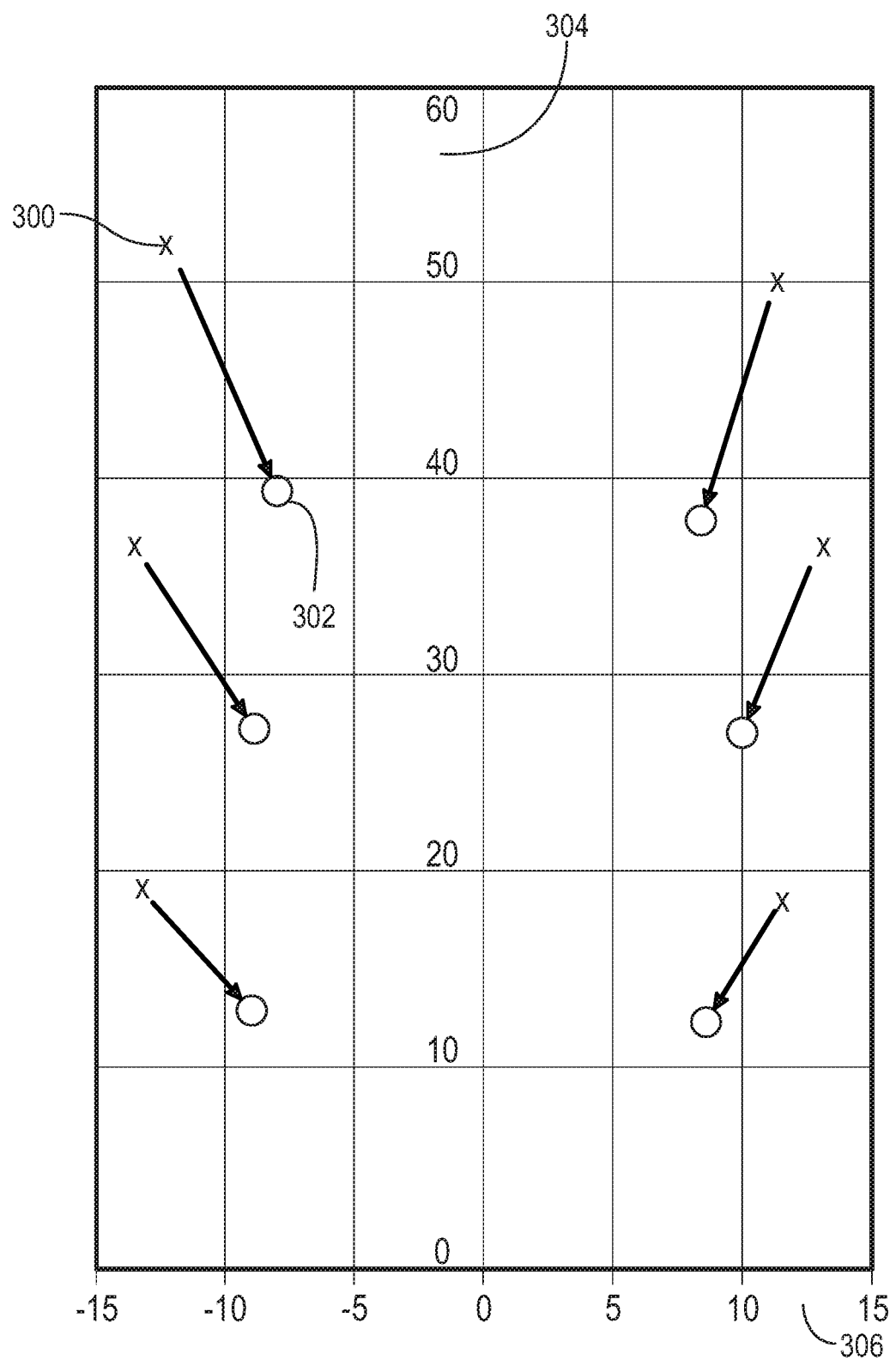
FIG. 3 (prior art) is a two-dimensional plot of estimation bias errors between gaze vectors (shown as X marks) and glint location (shown as O marks) in an existing cross-ratio eye tracking technique.

It will be appreciated that the most significant contributing factor to the estimation bias is the glints (e.g., glint 102) tracking the visual axis 108 at approximately half-angle to the camera optical axis 107. This error becomes larger over larger angles of the visual axis 108 to the camera optical axis 107. By fitting a linear regression to the sample observations presented in FIG. 3, we demonstrate that a simple linear relationship exists, in camera coordinates, that describes the relationship between the glint vectors and the pupil center vector with an $R^2 > 99.5\%$. The linear function is listed below:

$$G(x) = k_x + b_x \cdot P(x) \quad \text{(Equation 1)}$$

$$G(y) = k_y + b_y \cdot P(y) \quad \text{(Equation 2)}$$

wherein G is the one-dimensional glint coordinate (glint vector, x or y) from the camera origin (x=0, y=0), k is some projection of the angle kappa 112 (x or y), P is the one-dimensional pupil center coordinate (gaze vector, x or y) and b is some scaling factor (x or y) determined by parameters including refraction, corneal curvature and anterior chamber depth (ACD). Different parameters (k, b) exist for the x dimension (horizontal) and y dimension (vertical), and for each eye. These parameters can be found empirically, either separately or as part of method 800, by performing an example calibration method 820 for deriving parameters for a linear function for correcting estimation bias in a cross-ratio eye tracker.

Thus, to estimate the actual gaze vector (i.e. a vector corresponding to the actual angle of the line of sight relative to the camera's optical axis 107) based on the apparent gaze vector (i.e. the vector, in camera coordinates, from the camera origin to the center of the pupil visible in the camera image, also referred to herein as a "pupil center vector"), the pupil center vector is multiplied by the scaling factor ($b_x$, $b_y$), and the product is added to the constant ($k_x$, $k_y$), to compute estimated actual gaze vector. The estimated actual gaze vector (also called simply the "estimated gaze vector") may be scaled based on one or more ratios between the respective glint vectors of one or more light sources having known world coordinate locations in order to compute a gaze direction relative to the world coordinate locations of the respective light sources, e.g. to compute a gaze target within a 2D plane defined by the light sources (such as the plane of an electronic display with light sources at its corners).

Figure 10:
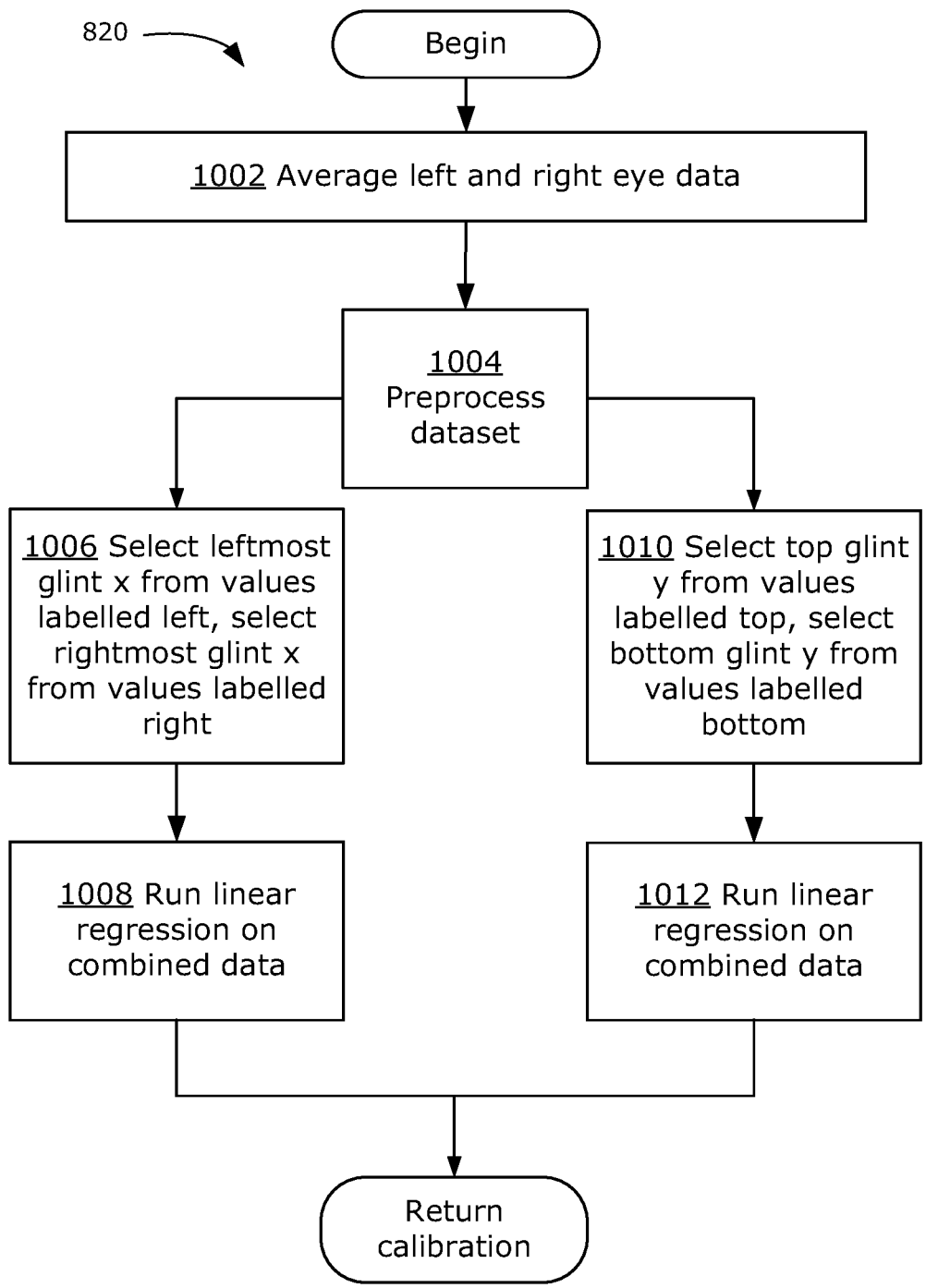
FIG. 10 is a flowchart showing sub-operations of the linear value calibration operation of the method of FIG. 8.

The method 820 is shown in the flowchart of FIG. 10 and described with reference to FIG. 4 and FIG. 10. The method 820 involves obtaining the parameters for the two linear equations per eye, one for correcting the vertical scaling effect and the other for correcting the horizontal scaling effect, by random sampling of gaze vectors and corresponding glint vectors during normal use of the display surface (e.g., but not limited to, a phone display).

Figure 4:
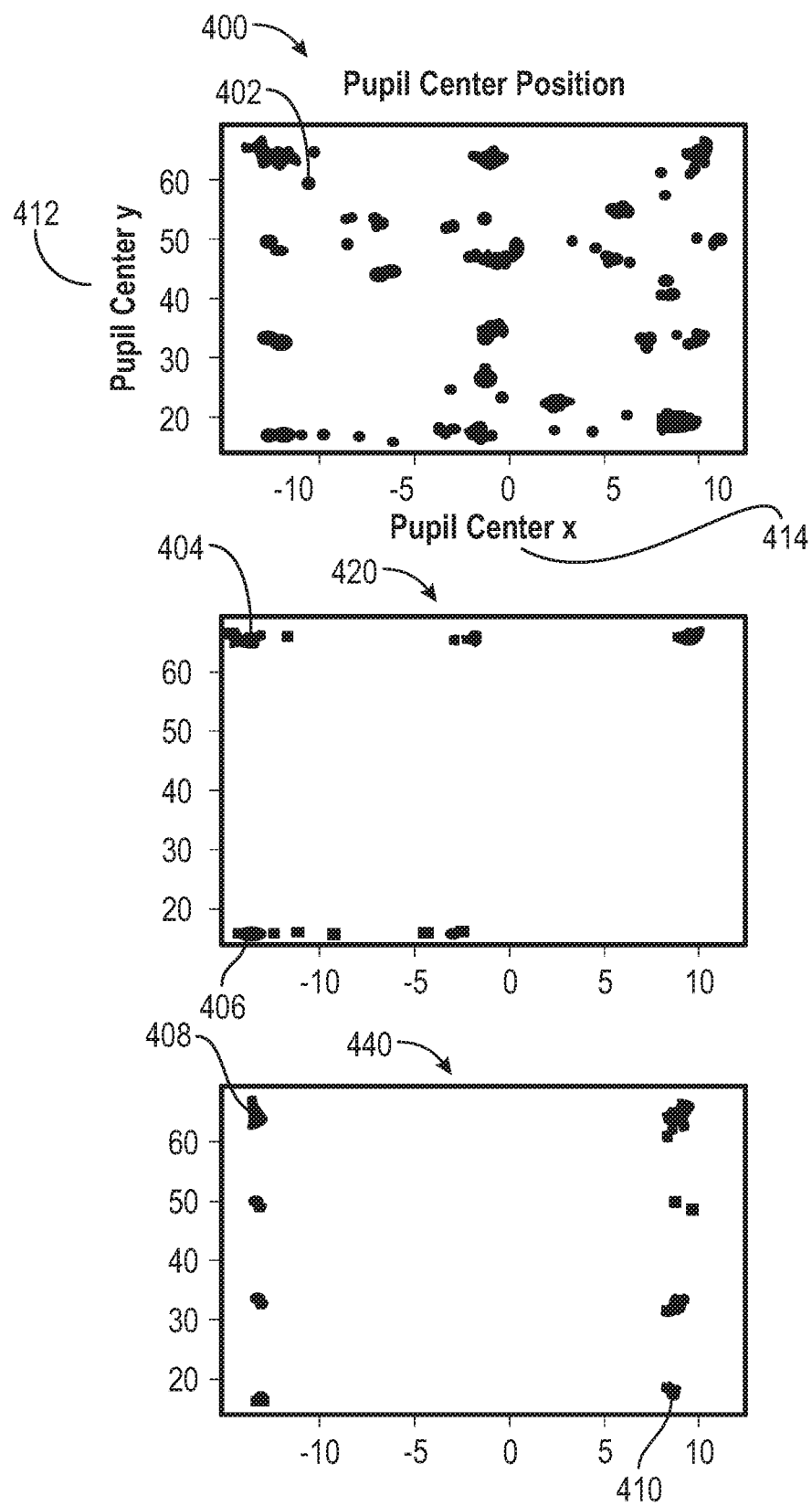
FIG. 4 is three plots showing distribution of a user's pupil center position while viewing a 2D rectangular display, showing pupil center positions filtered for statistically extreme high and extreme low vertical coordinate values, and showing the pupil center positions filtered for statistically extreme high and extreme low horizontal coordinate values, in accordance with example embodiments described herein.

FIG. 4 shows three plots 400, 420, 440 showing distribution of a user's pupil center positions (represented as camera coordinates) while viewing a 2D rectangular display. The second plot 420 shows the pupil center positions from the first plot 400 filtered for statistically extreme high and extreme low vertical (Y) camera coordinate values 412. The third plot 440 shows the pupil center positions from the first plot 400 filtered for statistically extreme high and extreme low horizontal (X) camera coordinate values 414.

For each gaze vector, a complete set of glint vectors 402 is measured, as plotted in first plot 400. The randomly sampled gaze vectors are then filtered by selecting, in the case of vertical scaling, a top Nth % 404 and bottom Nth % 406 of gaze vectors 402, wherein the percentile N may be empirically determined or based on the statistical properties of the set of random samples. The result of this filtering operation is shown in second plot 420, and is indicative of the top and bottom edges of the display. Next, the glint vectors corresponding to the left extremities 408 and right extremities 410 of the display are computed, e.g., again as a top Nth % of x values and bottom Nth % of x values of the gaze vectors 402. In some examples, different values of N may be used for the x and y coordinates respectively. In some embodiments, glint vectors are labeled by their location in their respective camera images and related to their location in the real world, i.e., the camera coordinates of each glint vector are mapped to world coordinates. Sets of minimum and maximum gaze vectors are deemed to correspond to the minimum and maximum glint vectors. The extreme glint vectors in the set are then measured, and a linear regression is performed with the set of extreme gaze vectors.

The same procedure used to generate and process second plot 420 is repeated, with reference to the X axis instead of the Y axes, to find the horizontal (left/right) extremities shown in third plot 440. In some examples, both vertical (Y) and horizontal (X) gaze vectors are computed by pooling the data of both eyes, as further described below. This may reduce the number of linear equations used for correcting estimation bias to two: one for horizontal correction and one vertical correction.

In some embodiments, outlier data points may be discarded before identifying the top and bottom Nth % of gaze vectors. In some embodiments, the outlier data points are identified as the highest and lowest 1% of gaze vector values in a given dimension (horizontal or vertical). In some embodiments, the value of N used for both the horizontal and vertical dimension is between 7 and 10. Thus, in an example in which N=10, the top 1% and bottom 1% of gaze vectors (by Y value), and the 1% right-most and 1% left-most gaze vectors (by X value) are discarded as outliers. The remaining gaze vectors are then sorted into a set of top edge values constituting percentiles 90-99 by Y value and a set of bottom edge values constituting percentiles 2-11 by Y value. The remaining gaze vectors are also sorted into a set of right edge values constituting percentiles 90-99 by X value and a set of left edge values constituting percentiles 2-11 by X value.

In some embodiments, a standard linear equation based on average parameters is first applied to the gaze vectors to bring them closer to the corresponding glint vectors, after which the extreme gaze vectors and their corresponding glint vectors are selected from the set. In some embodiments, image processing techniques are used to fit a rectangle to the set of gaze vectors. The coordinates of the rectangle are subsequently used to select extreme gaze vectors. In some embodiments, gaze vectors looking away from the rectangular display may be filtered out by only recording gaze vectors that are measured when the user is interacting with the display, as indicated by, e.g., touching a touchscreen, clicking a graphical user interface (GUI) element on the display using a mouse, etc. In some embodiments, outliers may be discarded by filtering measurements using data about the user's grip on the display and/or the orientation of the display (e.g., using an inertial measurement unit (IMU) of the display), data about the state of the display (e.g., active or inactive), and/or data about the presence of a face in the camera image.

While the linear equations above can be used to explain the majority (e.g., 99.5 percent or more) of the variance in the underlying gaze vector estimation bias error, test data indicate that each linear equation is an approximation of an underlying complex (i.e. non-linear) equation. This complex equation takes the shape of a tangential function with a substantial linear component. The ACD parameter of the eye has a reciprocal relationship with the slope of this function: the larger the ACD, the smaller the slope. The corneal curvature parameter of the eye has a positive relationship with the slope of this function as well as its intercept: the larger the corneal radius, the larger the slope and intercept. The frequency of the function is related to the distance z of the eye to the camera but is irrelevant from the point of view of camera coordinates, as all vectors are scaled by distance perspective. In contrast to the existing techniques described above, example embodiments described herein do not require that the users' eye parameters (e.g., ACD, corneal radius or refraction) are known.

It will be appreciated that references herein to a linear function are intended to include the use of any and all linear approximations of the underlying tangential function (such as but not limited to its derivative f'(0)), segments of said tangential function (as the non-linearity only occurs at extreme gaze angles that are unlikely when used with a regularly sized display), and/or the tangential function in its entirety to perform the scaling of said gaze vectors to said glint vectors.

It is important to note that kappa 112 differs considerably between the left eye and right eye, and between horizontal and vertical dimensions. Kappa 112 is much larger horizontally than vertically, and is negated between the left eye and right eye horizontally. This means that averaging out the left and right eye vectors may considerably reduce the error between the horizontal glint vector and the gaze vector. This is merely due to the summation of a negative and positive signal of similar magnitude. In some embodiments, the gaze vectors and/or glint vectors of the left eye are averaged with those of the right eye prior to running either horizontal or vertical linear regressions. Some embodiments first perform linear regressions on left eye and right eye data sets independently, then average the values after computing the corrected gaze vectors.

Example embodiments described herein may thus provide a linear solution for correcting estimation bias by scaling gaze vectors to glint vectors in cross-ratio eye tracking. The horizontal and vertical linear equations (Equation 1 and Equation 2 above) can also be used with explicit calibration steps as a means of calibrating a cross-ratio eye tracker when parameters of said linear solution are known.

In some embodiments, implicit calibration of the parameters ($k_x, b_x$ and $k_y, b_y$) of said linear equations may be performed by random sampling of gaze and glint vectors and statistically determining their belong to the set of gaze and glint vectors that define the extremities of the coordinate space (e.g., but not limited to a display) in the real world, as described below with reference to method 820 and FIG. 10.

Before describing the example methods in detail, example devices and systems will be described that are suitable for implementing one or more of the described methods.

Example Computing Devices and Systems

Figure 12:
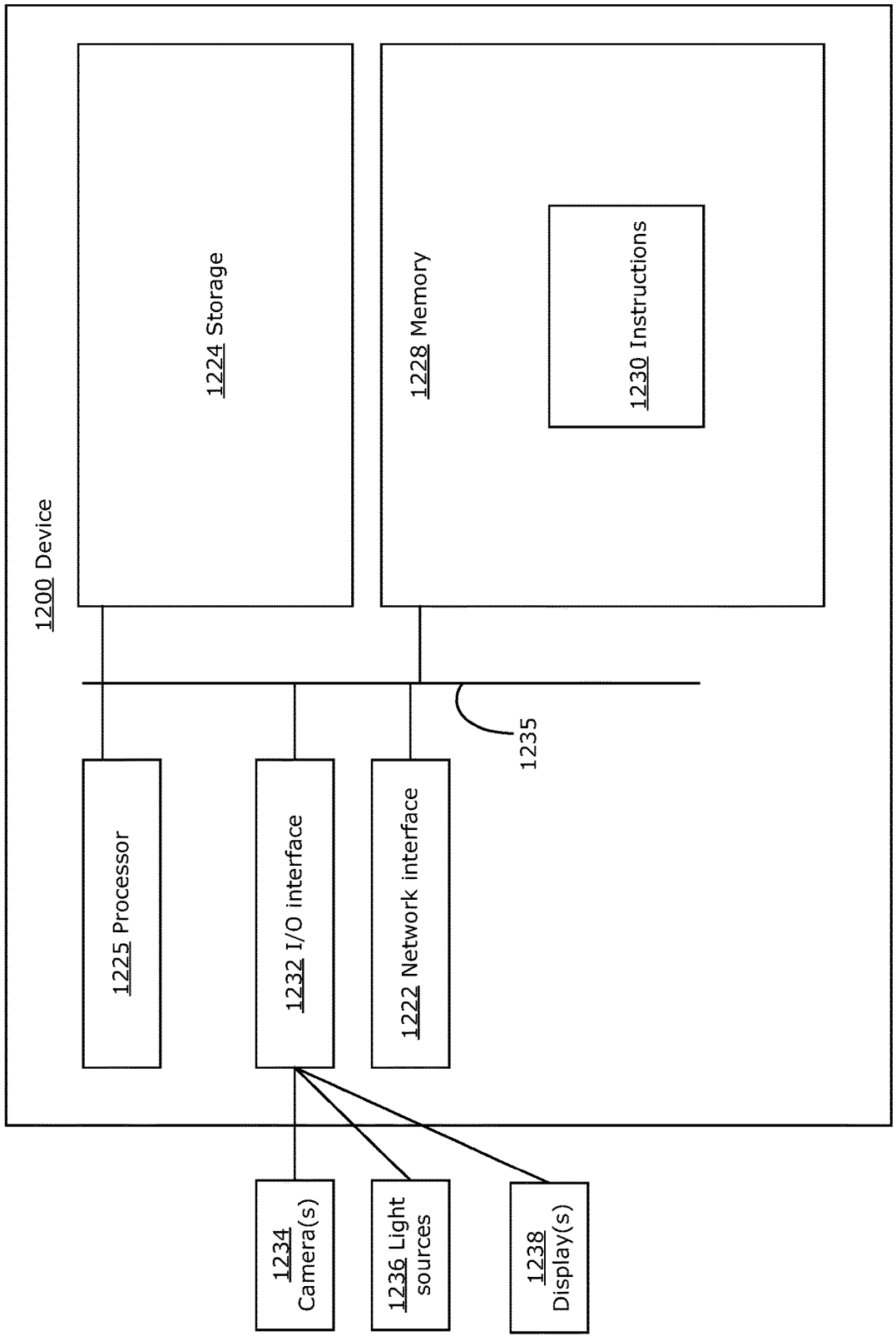
FIG. 12 is a block diagram illustrating a simplified example of a device suitable for implementing examples described herein, and in particular for executing the method steps and operations described herein.

FIG. 12 is a block diagram illustrating a simplified example of a device 1200, such as a smartphone, computer, or smart television, suitable for implementing examples described herein, and in particular for executing the method steps and operations described herein. In some embodiments, a distributed computing system, such as a cloud computing system, may be used to implement the functions of the device 1200. Other examples suitable for implementing embodiments described in the present disclosure may be used, which may include components different from those discussed below. Although FIG. 12 shows a single instance of each component, there may be multiple instances of each component in the device 1200.

The device 1200 of FIG. 12 illustrates an environment in which eye tracking may be performed using the methods described herein. The device 1200 may include one or more processor devices, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof (the processor devices being referred to collectively as a processor 1225). The device 1200 may also include one or more optional input/output (I/O) interfaces (collectively referred to as I/O interface 1232), which may enable interfacing with one or more input devices (such as one or more infrared cameras 1234) and/or output devices (such as one or more light sources 1236, e.g., infrared LEDS, and/or one or more displays 1238).

The device 1200 may include one or more network interfaces for wired or wireless communication with one or more devices or systems of a network, such as a network (collectively referred to as network interface 1222). The network interface 1222 may include wired links (e.g., Ethernet cable) and/or wireless links (e.g., one or more antennas) for intra-network and/or inter-network communications.

The device 1200 may also include one or more storage units 1224, which may include a mass storage unit such as a solid state drive, a hard disk drive, a magnetic disk drive and/or an optical disk drive.

The device 1200 may include one or more non-transitory memories (collectively referred to as memory 1228), which may include a volatile or non-volatile memory (e.g., a flash memory, a random access memory (RAM), and/or a read-only memory (ROM)). The non-transitory memory 1228 may store instructions for execution by the processor 1225, such as to carry out examples described in the present disclosure. The memory 1228 may include other processor-executable instructions 1230, such as for implementing an operating system and other applications/functions. In some examples, the memory 1228 may include instructions 1230 for execution by the processor 1225 to implement one or more methods relating to eye tracking, as described further below.

In some examples, the device 1200 may additionally or alternatively execute instructions from an external memory (e.g., an external drive in wired or wireless communication with the device 1200) or may be provided executable instructions by a transitory or non-transitory computer-readable medium. Examples of non-transitory computer readable (i.e. processor readable) media include a RAM, a ROM, an erasable programmable ROM (EPROM), an electrically erasable programmable ROM (EEPROM), a flash memory, a CD-ROM, or other portable memory storage.

The device 1200 may also include a bus 1235 providing communication among components of the device 1200, including those components discussed above. The bus 1235 may be any suitable bus architecture including, for example, a memory bus, a peripheral bus or a video bus.

It will be appreciated that various components and operations described herein can be implemented on multiple separate devices or systems in some embodiments.

Images received from the cameras 1234 may be processed by one or more Central Processing Units (CPUs) and/or Graphical Processing Units (GPUs) of the processor device 1225. The algorithms for computer vision described herein can run on either a CPU, a GPU, or some combination thereof. After determining the point of gaze in world coordinates, the processor 1225 may execute further instructions 1230 to convey the world coordinates to a software process executed by the processor 1225, and/or to a separate device 1200, configured to translate the coordinates into an action, such as the moving of a cursor on a display 1238.

Several example devices or systems are described below that may implement the eye-tracking methods and techniques described herein. The described embodiments may realize one or more advantages over existing approaches. In some such embodiments, the eyes of a user, and thus their point of gaze or point of attention, can be tracked without explicit calibration to the user. Calibration is achieved in the background by sampling random points of gaze during natural interactions. After a sufficient number of sample points is collected, the extremities of the display or windscreen can be determined statistically to produce the parameters of the linear equations that correct the estimation bias error. Such calibration steps can be repeated in the background to ensure a fit to, for example, but not limited to, changing ambient light conditions. Furthermore, given the simple nature of the linear equations, the scaling of gaze vectors to glint vectors is straightforward and can be performed on any sufficiently capable CPU or GPU or some combination thereof. In some embodiments, an explicit calibration procedure may be used as described above with reference to FIG. 4, in place of or in addition to the implicit calibration procedure described above with reference to FIG. 4 and described below with reference to FIG.s 10-11.

Example Smartphone or Tablet PC Device

Figure 1A:
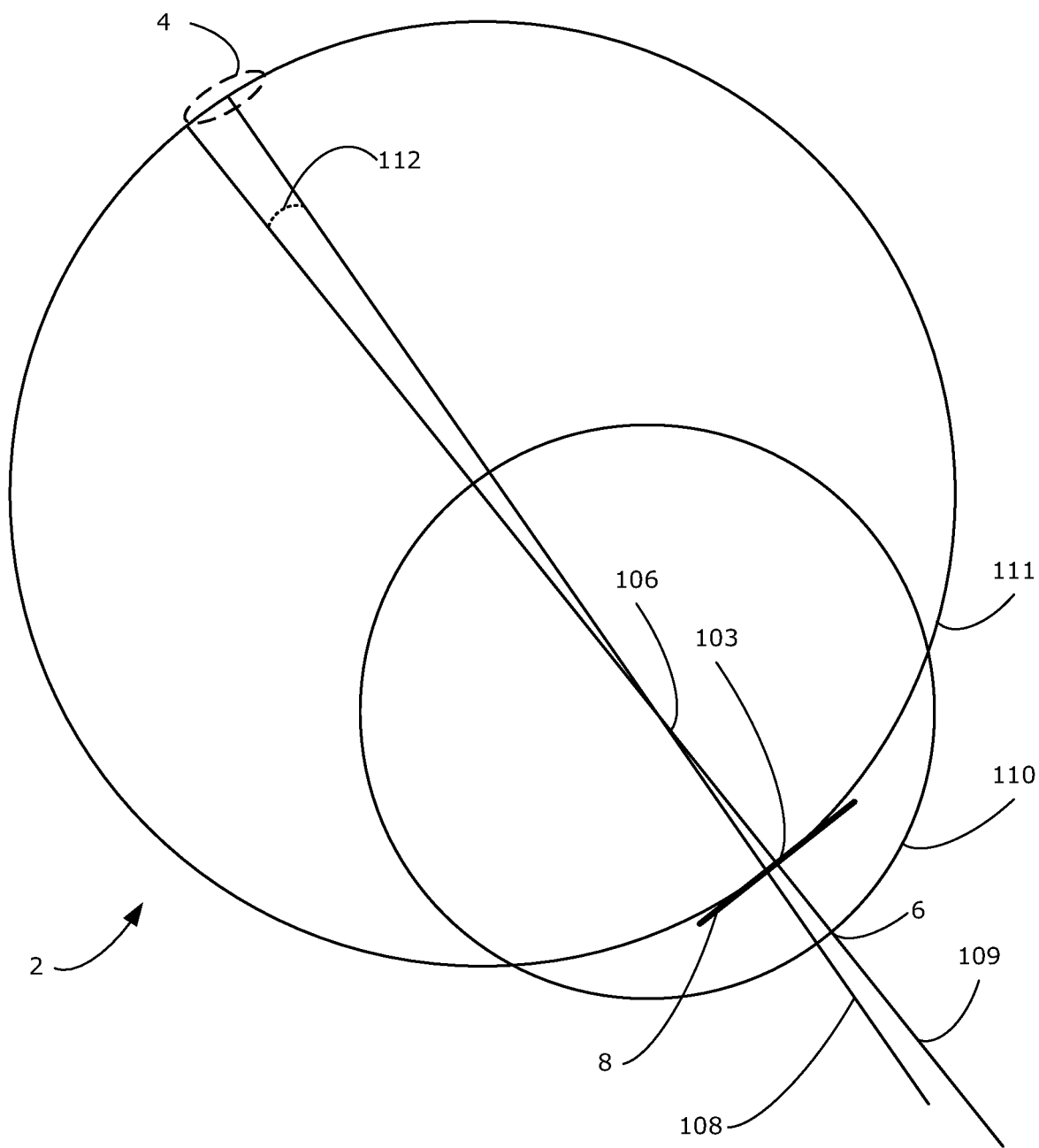
FIG. 1A (prior art) is a cross sectional view of an anatomical model of the eye, the cross section being taken through a plane defined by the optical axis and visual axis of the eye, showing an environment in which example embodiments described herein may operate.
Figure 1B:
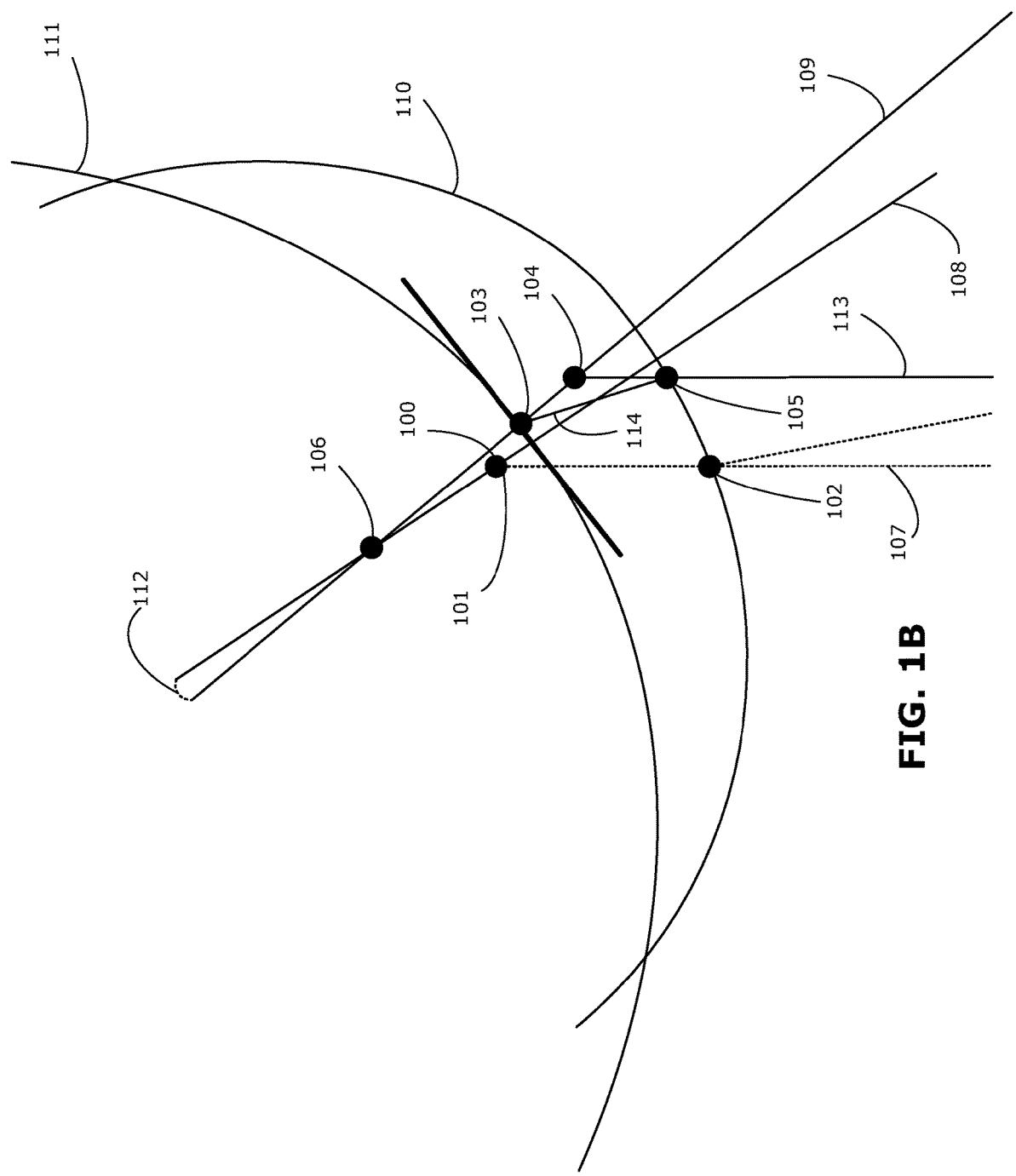
FIG. 1B is a detailed view of the corneal portion of the anatomical model of FIG. 1A, showing a number of anatomical and spatial features used by example embodiments described herein.
Figure 2:
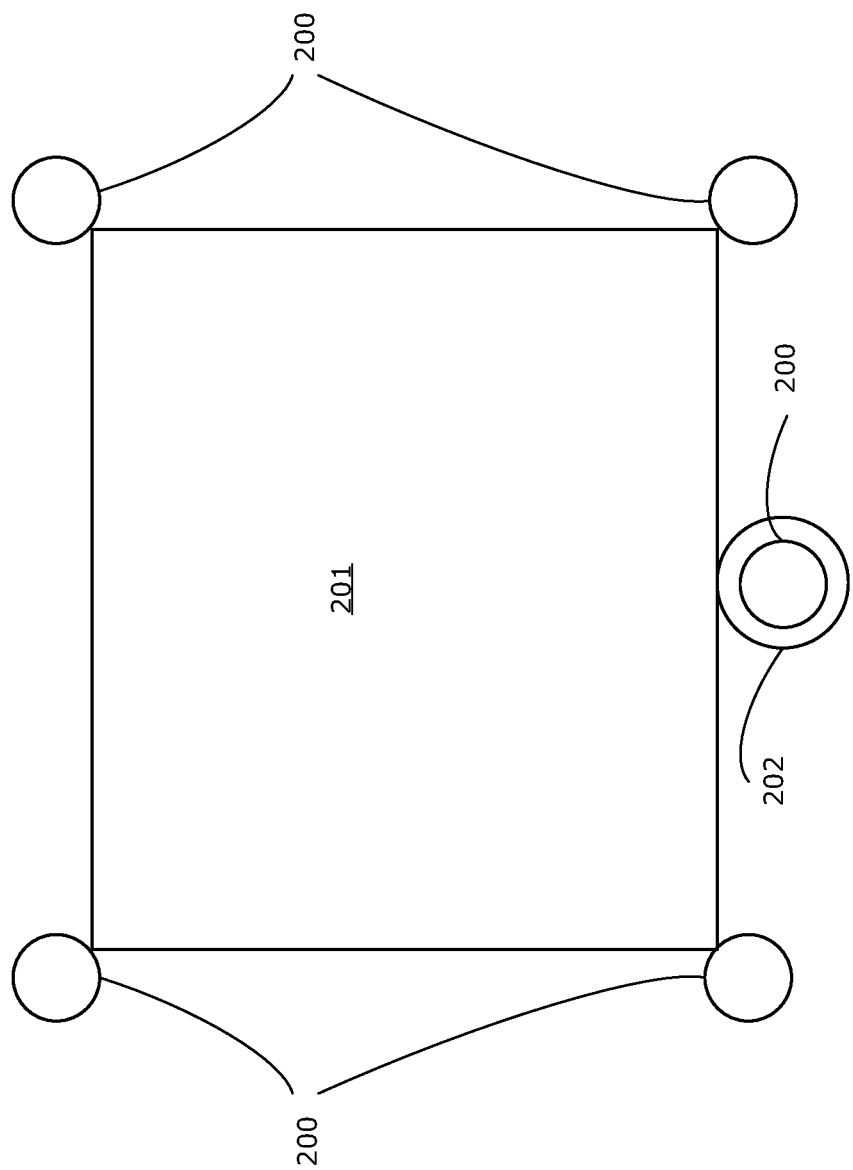
FIG. 2 (prior art) is a front view of an array of light sources used for eye tracking, in accordance with existing approaches.

FIG. 2 (prior art), described above, shows a conventional hardware configuration for use with the existing cross-ratio approach to eyetracking. Four LEDs 200 mark the corners of a display 201, with the camera 202 placed below the display 201. The reason for placing the camera below the screen is that it provides a better view of the eye without they eye being obscured by eyelids. A fifth LED marks the camera, and can be mounted next to, or even on top of, the lens assembly of the camera 202.

As described above, each of the LEDs 200 produces a reflection on the cornea 110 visible to the camera 202 as a white dot (glint) near or inside the pupil. Since the pattern of glints is known, simple pattern recognition algorithms can be used to determine which of these glints is in which corner, and which is the origin indicating the LED on the camera (i.e., glint 102). All measurements are taken from this origin corresponding to glint 102, which is coordinate (0, 0), i.e., (x=0, y=0).

Figure 5:
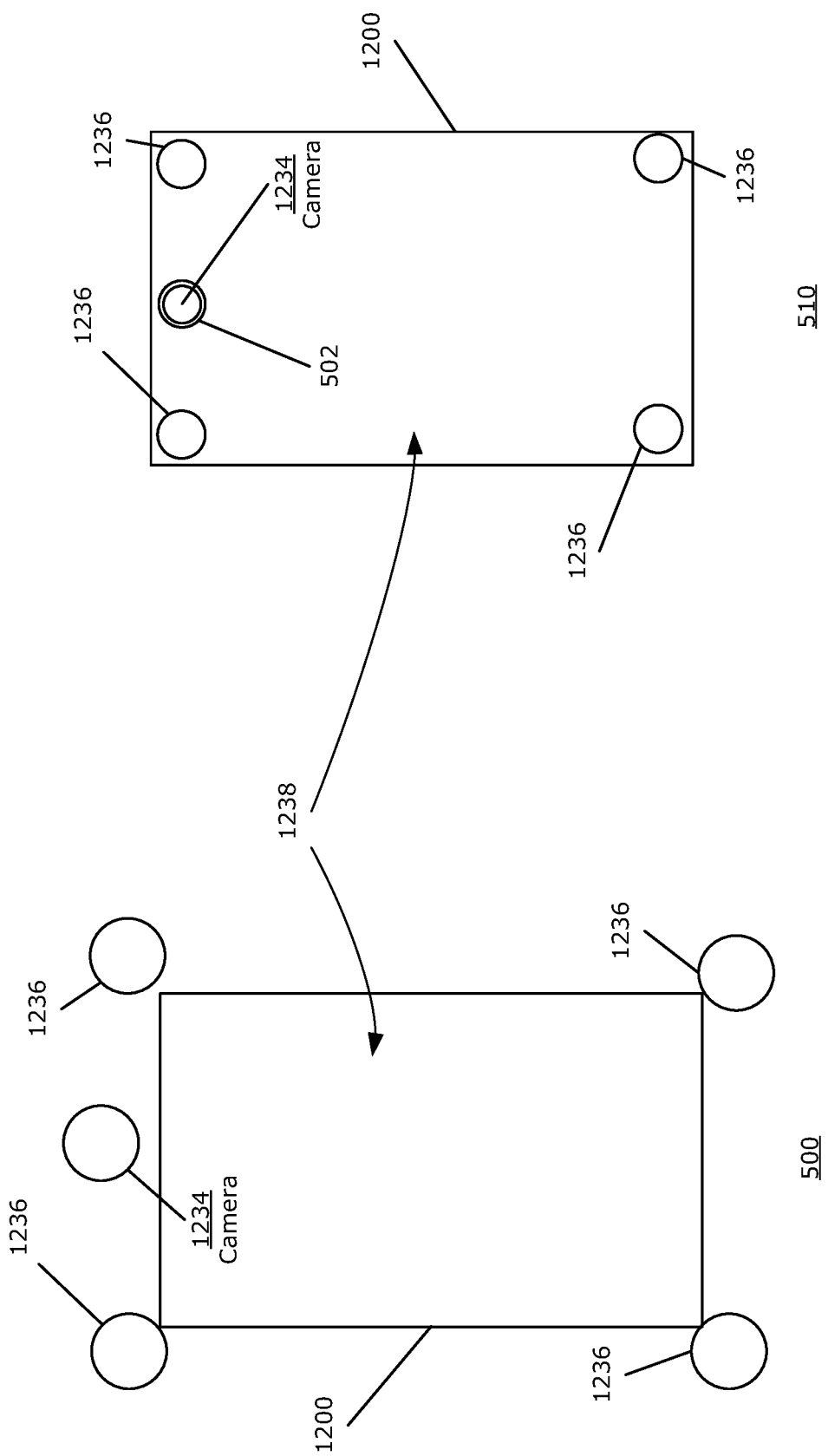
FIG. 5 is a simplified front view of two alternate configurations of a smartphone display in accordance with example embodiments described herein, the first configuration having light sources outside of the corners and at a camera location above the top edge for eye tracking, and the second configuration having light sources behind the display at the corners and at a camera location behind the display along the top edge for eye tracking.

FIG. 5 shows two example configurations 500, 510 of a device, such as a smartphone or tablet computer device, for performing methods relating to eye tracking as described herein. Each configuration 500, 510 may be applied to the example computing device 1200 described above in the form of, e.g., a smartphone or tablet computer.

In each of the two configurations 500, 510, there is no fifth LED. Instead, because the camera 1234 (e.g., an infrared camera) is substantially aligned with the top or bottom row of light sources 1236 (e.g., infrared LED light sources), the origin of the camera 1234 can be calculated by taking the middle of the line intersecting these two light sources 1236 (shown here as the two top LEDs). In some embodiments, the computing device 1200 is a smartphone; in others, the computing device 1200 is a tablet PC or another type of device. The light sources 1236 are mounted on the corners of the display 1238 of the computing device 1200. In smartphone and tablet embodiments, the camera 1234 can be embedded behind the display 1238, with a small hole 502 protruding through the display 1238. In some embodiments the light sources 1236 are mounted behind the display 1238 as well, such that the row of light sources 1236 that are adjacent to the camera 1234 (e.g., the two bottom light sources 1236 if the camera 1234 is along the bottom of the display 1238, or the two top light sources 1236 if the camera 1234 is along the top of the display 1238 as shown in configuration 510) are substantially vertically aligned with the center of the camera 1234. In some embodiments, an asymmetrical placement of light sources 1236 is used to improve pattern matching, especially when some of the glints are obscured. In some embodiments, visibility of the light sources 1236 is improved by increasing the transparency in the infrared range for the parts of the display 1238 that cover the light sources 1236 using techniques known to those skilled in the art. In some embodiments, the brightness and surface area of the light sources 1236 can be modulated depending on environmental infrared levels, as determined by a sensor, such as an infrared light sensor (not shown). In some embodiments, a plurality of light sources 1236 is arranged around the display 1238 or laid in a grid pattern behind the display 1238. This aids the identification of glints when partially obscured. In various embodiments, the light sources 1236 are not limited to LEDs. They may include light sources selected from the list of, but not limited to: lasers, laser diodes, strip lights, incandescent light bulbs, a rectangular diffuser with single or multiple light sources behind it, or optical fibers that direct the light from a light source placed a different location. It will be appreciated that the minimum number of light sources visible as glints in the image is two: for example, a first light source substantially aligned with the camera optical axis 107 to indicate the camera origin (0, 0), and a second light source diagonally placed substantially away from the first light source both horizontally and vertically, for example at the diagonal extremity of the real world tracking area. Thus, for example, the first light source and camera could be located along the top edge of the display, and the second light source could be located at the bottom left or bottom right corner of the display. In principle, all other geometric details may be derivable from the locations of these two glints in the image, with each glint corresponding to a known spatial location of a light source relative to the spatial location of the camera.

To avoid users being blinded by the light sources 1236, and to improve contrast of the pupil, in some embodiments the camera 1234 is sensitive in the near-infrared spectrum. To allow for high resolution tracking over a short degree of arc, the camera sensor may have a minimum resolution of 4K. Alternatively, super resolution algorithms known to those skilled in the art can be applied to image data generated by lower resolution camera sensors. Higher resolutions can be achieved by using a black and white image sensor with sufficient Quantum Efficiency (QE) in the 800-1000 nanometer range of wavelength. In some embodiments a low pass filter is placed between the lens of the camera and the image sensor, only passing light with larger than 700 nm wavelengths. To avoid any of the LED lights being visible to the naked eye, the wavelength may be in the 950 nm range. While this may require the use of Forward Looking Infrared (FLIR) sensors, there is a tradeoff between longer wavelength QE and resolution in such image sensors. In some embodiments, the lens has a focal length of at least 25 mm to allow a closer view of the subject's eyes. The focal length of the lens, however, may effect a tradeoff with resolution as well: the higher the resolution, the wider the field of view of the lens can be. Furthermore, the focal length of the camera may be selected such that the face of the user remains visible at all times.

The PoG computed using the examples and embodiments described herein can be used in a number of applications including, but are not limited to, selecting graphic elements on the display 1238 for input. In some embodiments, a GUI element being looked at (as determined by the computed PoG) may be visually highlighted or otherwise indicated to the user via visual feedback on the display 1238. The selected GUI element may then be activated to trigger a software command, e.g., via speech input, or via a button or virtual button input.

Example Laptop or Desktop PC Device

Another example embodies the device 1200 as a laptop or desktop PC. In some such embodiments, the camera 1234 may be placed at the bottom of the display 1238, with the LED markers (i.e. light sources 1236) placed on the corners of the display 1238 as per FIG. 2, or the camera 1234 may conform to the first configuration 500 of FIG. 5. The camera 1234 may or may not be marked with an LED light source 1236 depending on the camera's 1234 substantial alignment with the adjacent corner light sources 1236. Applications of eye tracking data in such example embodiments include, but are not limited to, selecting graphical elements for input, e.g., by moving a visible cursor on the display.

Example Smart Television or Large Display Device

Another example embodies the device 1200 as a television or other large display. In some examples, the television or other large display acts as a display for a computing device. In some such example embodiments, the camera 1234 can be placed above or below the display 1238 as per FIG. 2, or as per first configuration 500 of FIG. 5. In some examples, privacy provisions may require a robotic camera that can be visibly withdrawn when the user desires not to be tracked. Due to the distant nature of large displays, the power and surface area requirements of the LEDs used as light sources 1236 may be greater than with the smartphone or tablet embodiments of FIG. 5. The camera 1234 may also require higher resolution than 4K, e.g., but not limited to 8K. Applications of eye tracking data in this embodiment include, but are not limited to selecting graphical elements for input, e.g., via speech. In some such embodiments, further processing of the camera data may be necessary to isolate a single user when multiple humans are visible in the camera images. It will be appreciated that various computer vision and user interface techniques have been developed for identifying and interacting with users in a multi-person environment, and the examples described herein may be used to provide eye-tracking input for use within such contexts.

Example Vehicle Dashboard Eye Tracking System

Figure 6:
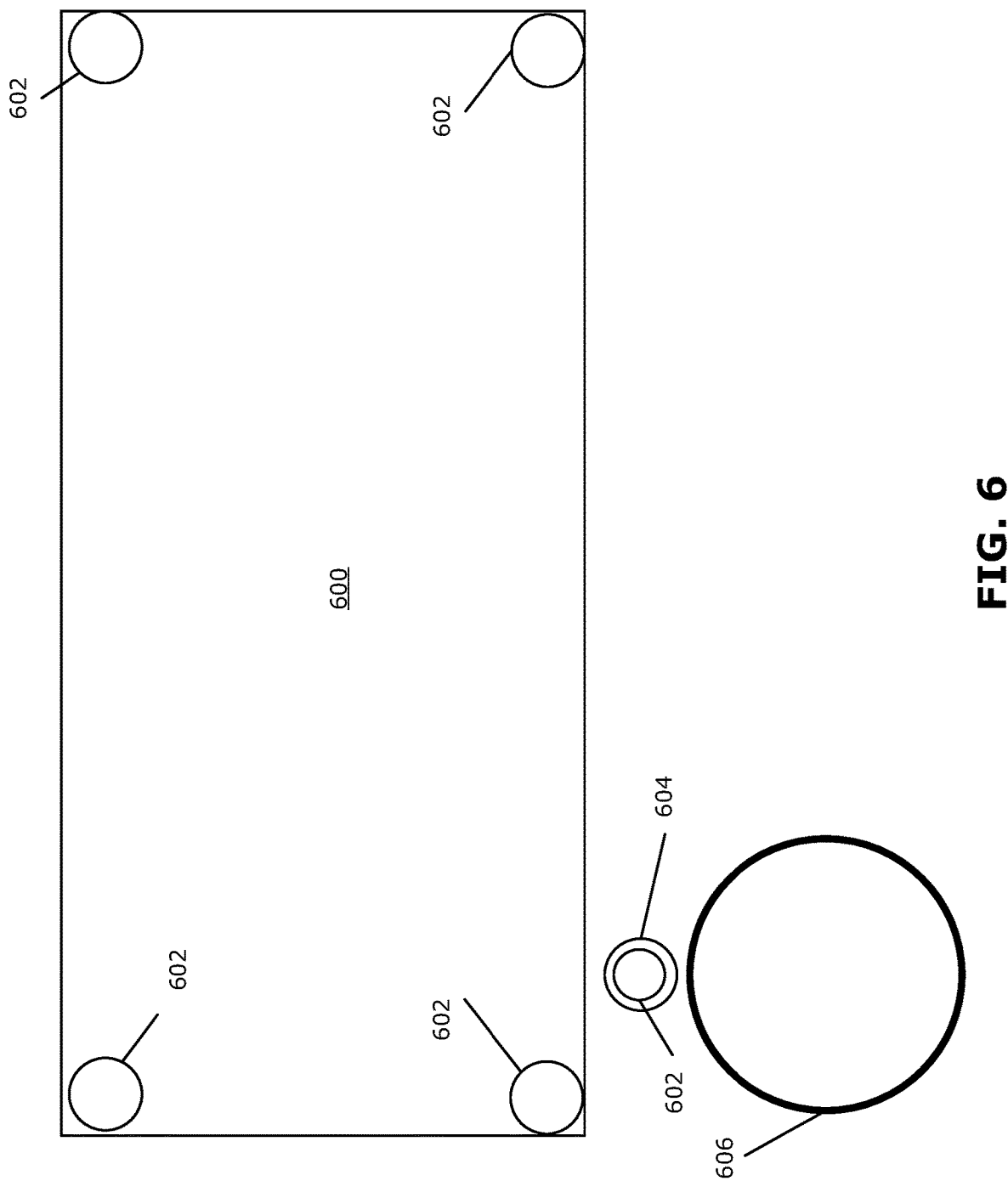
FIG. 6 is a simplified driver's-eye view of an eye-tracking apparatus embedded in a car dashboard and windscreen, in accordance with example embodiments described herein.

FIG. 6 shows a further embodiment in which the device 1200 performing eye tracking is integrated into the dashboard of a car. In the illustrated example, the camera 604 is placed in front of the driver, above or in the steering wheel 606. Markers 602 (e.g., light sources 1236 or other visually distinct markers that generate glints on a corneal surface 110) can be placed on and/or around the windscreen 600. Additional markers 602 can be placed on or adjacent to user interface elements of the dashboard, such as in-car entertainment or navigation systems (not shown). Windscreen markers 602 can be invisibly embedded in the glass, or mounted on the corners of the windscreen 600. Due to the large field of view, a plurality of markers 602 placed along the edges (not shown) can aid in identification of glints. It will be appreciated that in some embodiments, the brightness and surface area of the markers 602 can be modulated depending on ambient infrared levels as determined by a sensor (not shown). Potential applications of eye tracking data in the example car embodiment of FIG. 6 include, but are not limited to, safety applications such as tracking whether the eyes of the driver are open and on the road, and selecting GUI elements of a heads-up display or dashboard display for input, e.g., via speech input.

Example VR/AR Head Mounted Display Unit

Figure 7:
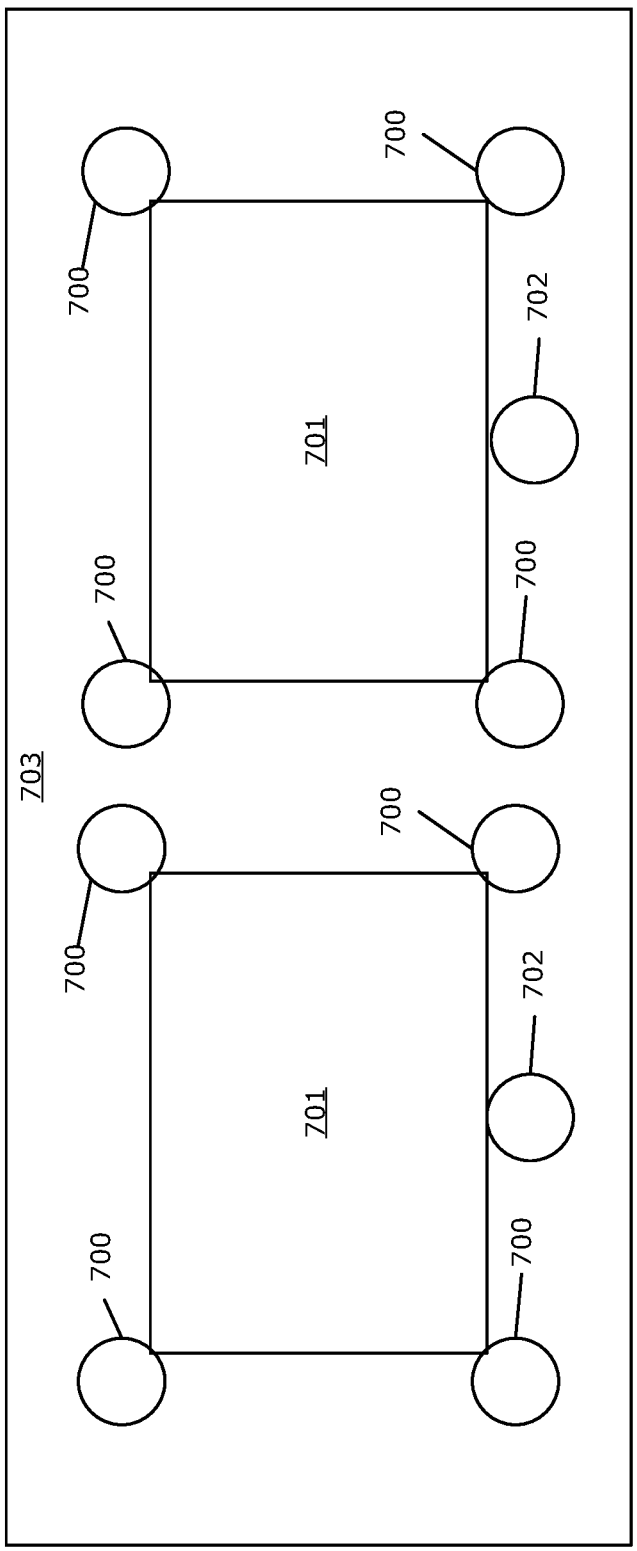
FIG. 7 is simplified user's-eye view of a stereoscopic VR/AR head-mounted display unit or other glasses having light sources at the corners of each display and at a camera location below the bottom edge of each display for eye tracking, in accordance with example embodiments described herein.

FIG. 7 shows a further example embodiment in which the device 1200 performing eye tracking is integrated into a headset 703 of a Virtual Reality (VR) or Augmented Reality (AR) head mounted display (HMD) unit. It will be appreciated that the configuration shown in FIG. 7 is equally applicable to glasses, goggles, or other head-mounted devices, with or without electronic displays, thereby enabling the device to perform eye-tracking. The illustrated embodiment uses dual cameras 702, one placed under each display 701 of the HMD. In some embodiments, a single camera could be used, tracking only one eye. In the illustrated embodiment, markers 700 (e.g., light sources 1236 or other visually distinct markers that generate glints on a corneal surface 110) are placed around each display 701. In embodiments having two cameras 702, each eye may be tracked independently, using independent linear equations for scaling of the pupil center to the glint coordinate system. Markers 700 can be embedded behind the display 701, as long as either an additional marker 700 indicating the camera 702 is provided, or said markers 700 are substantially aligned horizontally or vertically with the camera 702 placement. Calibration of a VR headset may be particularly straightforward in some examples, because the point of gaze would typically always lie within the extremities of the displays 701. In an AR headset the markers 700 may need to define the boundary of the display space on the headset 703 that is capable of displaying augmented reality images. Potential useful applications of the computed PoG in the VR/AR context include, but are not limited to, tracking 3D focus of the user's eyes in the 3D VR or AR space, and selecting virtual elements for input, e.g., by speech input, gesture input, or input using a hand-held input device.

Detailed Flowcharts of Example Eye Tracking Methods

FIG. 8 shows an overview flowchart of a method 800 for determining the gaze direction of an eye. In the above example devices, the CPU or GPU or some combination thereof of the processor 1225 is used to process the images of the camera 1234 and output a point of gaze measurement by performing method 800.

Figure 9A:
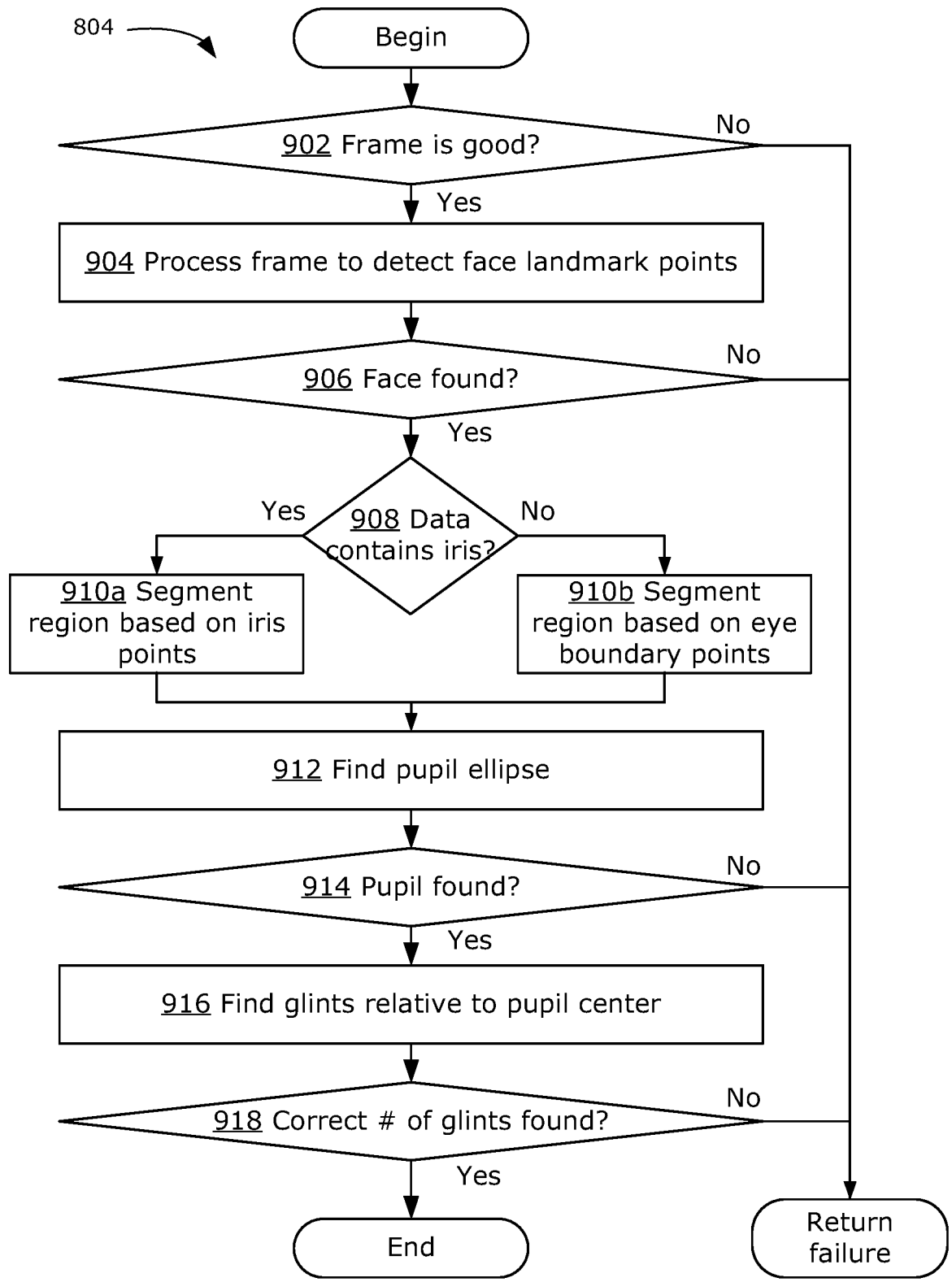
FIG. 9A is a flowchart showing sub-operations of the image processing operation of the method of FIG. 8.

At 802, a camera frame (i.e., an image generated by the camera 1234) is received from the camera 1234 and processed by the processor 1225 at 804 to find the pupils and glints according to the image processing method shown in FIG. 9A.

FIG. 9A shows the details of step 804. At 902, the frame is processed to determine whether it contains useful image information. If not, step 804 returns a failure value and method 800 processes the next frame; otherwise it proceeds to step 904. At 904, the user's face is detected in the frame using an algorithm that returns face landmark points (also referred to as face key points), including at minimum the boundary of the eye region. At 906, if no faces are detected, step 804 returns a failure result and method 800 returns to 802 to process the next frame; otherwise it proceeds to step 906.

In some examples, if the method 800 uses a Region of Interest as the image passed to step 804, a failure at step 906 may result in increasing the Region of Interest and repeating step 906 until either the maximum area of the Region of Interest is reached or a face is found.

It will be appreciated that it is not necessary to determine the angle of rotation of the face, because the eyes operate independently from the head, and the glints indicate the location of the reflection relative to the camera. However, when the face is rotated at an extreme angle, method 800 may process only the image of the visible eye rather than both eyes and utilize the PoG of the single visible eye as a sole input. If no eyes are detected (e.g., at step 906), a failure result is returned by step 804 and method 800 will return to step 802 to process the next frame.

At 908, if the list of face landmark points includes the iris locations, then the method proceeds to step 910a, otherwise to step 910b. At 910a, two segments of the image are generated that encompass the iris. At 910b, landmark points around the eye are selected and a region is selected for each eye that encompasses all the eye features.

At 912, the regions from 910b or the two segments of 910a are processed to identify the pupil inside the iris region or eye region. This is performed on each visible eye independently and concurrently. A pupil finding algorithm returns an ellipse defining the pupil region. At 914, if no pupil can be identified, then a failure result is returned by step 804 and method 800 will return to step 802 to process the next frame.

At 916, the image is segmented around the pupil region, with a margin, and glints are detected. If the correct number of glints are found at 918, the method 800 will continue to step 806, otherwise a failure result is returned by step 804 and method 800 will return to step 802 to process the next frame. However, in some embodiments the algorithm may be made robust to partial occlusion or partial visibility of glints by matching a subset of the glint configuration at step 806, described in greater detail below with reference to FIG. 9B.

Figure 9B:
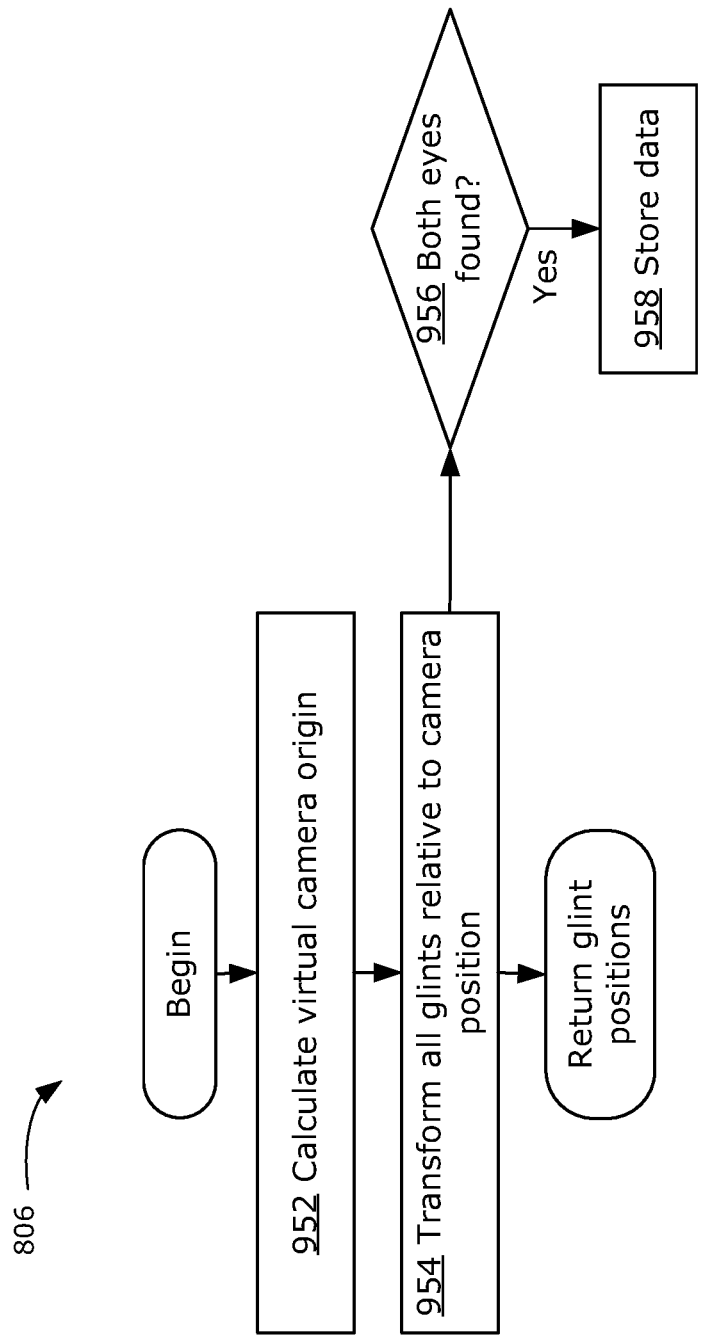
FIG. 9B is a flowchart showing sub-operations of the glint processing operation of the method of FIG. 8.

FIG. 9B shows the details of glint processing step 806. At 952, the camera glint is identified, and the measurement of the pupil center is transformed into a gaze vector relative to the (0,0) coordinate of this glint. If the camera glint is not present, a midpoint is calculated between the two adjacent corner glints instead, which represents the origin (0,0). At 954, the glint vector is calculated relative to the camera origin for each remaining glint. These glint positions are returned. In addition, at 956, if both eyes were detected in the image (e.g., at step 914 of FIG. 9A) then the gaze vectors are collected and stored in memory along with the corresponding glint vectors at 958. In some embodiments, each glint vector is labeled according to its corresponding location in the real-world (i.e. world coordinates) using a format such as, but not limited to, an XML file associating each LED with its real-world or display coordinates.

At 810, after glint processing is complete at 808, if insufficient data exists for the current user to determine the parameters of the linear equations (i.e. Equation 1 and Equation 2 above), then calibration may be performed by a calibration operation 820 before proceeding to 812. Otherwise the method 800 proceeds directly from 810 to 812. Insufficient data may be determined based on the number of gaze vector samples for the current user being below a threshold value. (The threshold value is shown as N in FIG. 8—it will be appreciated that in this example, the data sample threshold value N is unrelated to the N percentile value referred to above in reference to FIG. 4.)

FIG. 10 shows steps of an example calibration operation 820. After a sufficient number of samples is stored at step 958 described above, the data from the left and right eye is averaged at 1002, including both the recorded pupil center locations and glint positions. Next, at 1004, the resulting dataset is preprocessed, as described in greater detail below with reference to FIG. 11.

Figure 11:
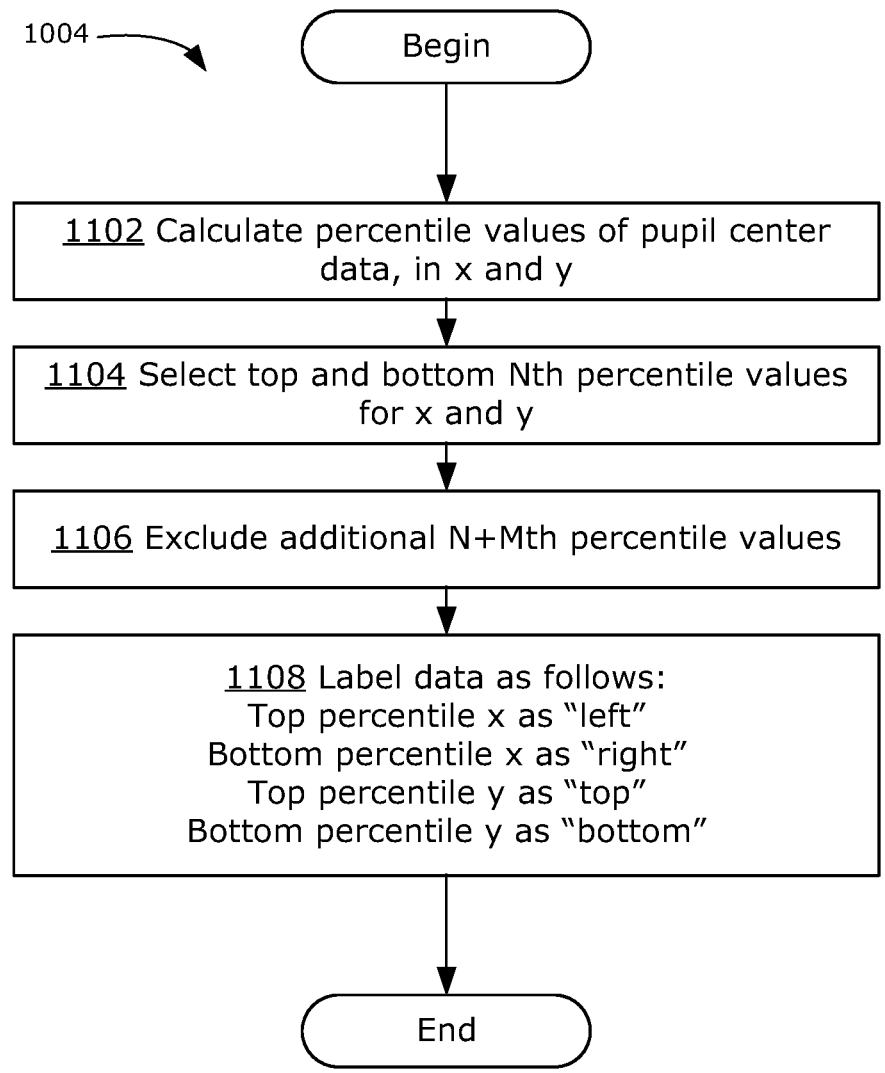
FIG. 11 is a flowchart showing sub-operations of the dataset preprocessing operation of the method of FIG. 8.

FIG. 11 shows details of preprocessing step 1004 of calibration operation 820 of method 800, in which the gaze vectors defining the exterior of the display are determined. In some embodiments, an algorithm takes the subset of gaze vectors that lie within the top or bottom Nth coordinate percentile, as described above with reference to FIG. 4. This is performed independently for the x (horizontal) and y (vertical) components, for each eye, and determines the extremities of the display area in the gaze vector coordinate system. At 1102 the percentile values of pupil center data are generated for both x and y coordinates. At 1104 the top and bottom N percentile values are selected for both x and y. In some examples, outliers may be discarded at step 1106 by excluding N+Mth percentile values, e.g. excluding the top and bottom 1%, as described above with reference to FIG. 4. At 1108, the selected data is labelled according to its location: the top x values are labelled "left", the bottom x values are labelled "right", the top y values are labelled "top", and the bottom y values are labelled "bottom".

Returning to FIG. 10, after preprocessing step 1004 each gaze vector contains real-world labelled glint coordinates for all light sources on the device. At 1010, the program will select the top glint y value, for all points labelled as "top", and the bottom glint y value for all labelled "bottom". At 1012, a linear regression is performed on the pupil center y value and the glint y value with the calculated regression parameters being stored for later use.

The same process is applied in the horizontal dimension. At 1006 the right glint x value is selected for all points labelled as "right" and the left glint x value is selected for all points labelled "left". At 1008, a second linear regression is performed between the pupil center x values and the glint x values in this set.

In some embodiments, the linear regression 1008, 1012 can be performed on the left and right eye data independently. Calibrations can be updated in the background whenever a significant discrepancy is detected between computed PoG coordinates and those obtained with a new set of parameters for the linear equations.

After calibration at 820 or after step 810, the method proceeds to compute the PoG at 812. If the data for the left and right eye was averaged into two linear regressions at 820, one for horizontal and one for vertical, the gaze vectors of both eyes may be averaged upon measurement and then entered into the linear equation to scale them to the glint vectors that relate them to real-world coordinates. Optionally, this step can be performed using a standard linear equation with mean values for kappa 112 and b (i.e., the slope in Equations 1 and 2) prior to calibration to allow for immediate calibration-free eye tracking.

If the data for the left and right eye was not pooled into a single linear regression, step 812 may be performed independently for each eye. Optionally, the resulting gaze vectors can be averaged between eyes after entering them into the linear equation.

Next, the coordinate in the real world of the gaze vector is determined for each measured gaze vector, by calculating its distance vector to each of the glints. The real-world coordinate is determined by subsequently adjusting the length of the vector between the location of corresponding light sources in real world coordinates as per the cross-ratio method described by [Yoo 1 and Vertegaal], and averaging the resulting vectors. In some embodiments, the real-world point of gaze coordinates are found by index in an XML file that relates glint vectors in camera coordinates to locations of light sources in the real world.

At 814, the method 800 may determine whether the PoG computed at 812 places the user's gaze within the bounds of the display 1238 or other visual region of interest, as described above. If the user is not looking at the display 1238, the PoG data may not be used in some examples, and the method 800 may return to 802 to process the next camera frame. Otherwise, if the user is determined to be looking at the display (or otherwise within the acceptable bounds or limits of the object or region of interest), the method 800 proceeds to 816. When light sources are associated with a display 1238, real world point of gaze coordinates are output as display coordinates at step 816 and used as input by some other part of the system, e.g., but not limited to, moving a cursor.

At 818, if the gaze tracking method 800 continues to operate, the method 800 returns to 802 to process the next camera frame.

In some embodiments, the linear regression is used to find the parameters for the complex tangential function, which is then used to correct the gaze vector estimation bias error. In another embodiment a projective transform, known to those skilled in the art, is applied to accommodate for movements or rotations of the display relative to the head. In a final embodiment, a neural network is used to determine the linear relationship between glint and pupil center over time, provided ground truth through statistical sampling of gaze vectors correlating with edges of the real world coordinate space.

Alternative Embodiments

Example methods and techniques described herein can be applied to any use of cross-ratio eye tracking in which there is a statistical likelihood that a user is looking within an identifiable boundary region of the real-world coordinate space. The boundary region is typically rectangular, such as a conventional display 1238, but need not necessarily be. Example eye tracking techniques described herein can be embedded or used as input to any computational device or process.

General

Although the present disclosure describes functions performed by certain components and physical entities, it should be understood that, in a distributed system, some or all of the processes may be distributed among multiple components and entities, and multiple instances of the processes may be carried out over the distributed system.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. In general, the software improves the operation of the hardware in one or more ways.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for estimating a gaze direction of an eye, comprising:
   obtaining an image, the image comprising:
      a pupil of the eye, the pupil being associated with a pupil center location within the image; and
      a first glint reflection on a surface of the eye, the first glint reflection being associated with:
         a first light source at a known first light source spatial location relative to a known camera origin spatial location in the real world; and
         a first glint location within the image;
   processing the image to estimate a camera origin location within the image;
   processing the image to estimate the pupil center location;
   processing the image to estimate a pupil center vector by calculating a vector, in camera coordinates, between the camera origin location and the estimated pupil center location;
   processing the image to estimate the first glint location of the first glint reflection; and
   generating a scaled pupil center vector by applying a mathematical function having a substantially linear component to the pupil center vector to scale the pupil center vector to a coordinate system based at least partially on the camera origin location and the first glint reflection.

2. The method of claim 1, wherein:
   the pupil center vector has a horizontal component and a vertical component; and
   the substantially linear component of the mathematical function comprises:
      a horizontal linear function for estimating the horizontal component of the pupil center vector, comprising the sum of:
         a constant horizontal component; and
         a horizontal scaling factor multiplied by a horizontal component of the pupil center vector; and
      a vertical linear function for estimating the vertical component of the pupil center vector, comprising the sum of:
         a constant vertical component; and
         a vertical scaling factor multiplied by a vertical component of the pupil center vector.

3. The method of claim 2, wherein:
   the constant horizontal component and constant vertical component correspond to individual angular differences between an optical axis of the eye and a visual axis of the eye.

4. The method of claim 2, wherein:
   the image further comprises:
      a second glint reflection associated with a second glint location within the image and a second light source at a second light source spatial location;

the method further comprising:
processing the image to estimate the second glint location of the second glint reflection; and
wherein processing the image to estimate the gaze direction further comprises:
processing the estimated camera origin location, the scaled pupil center vector, the first glint location, and the second glint location to determine:
a gaze vector in camera coordinates; and
a ratio of:
the distance from the scaled pupil center vector to the first glint location; and
the distance from the scaled pupil center vector to the second glint location;
processing the ratio and the gaze vector to estimate a point of gaze, in world coordinates, relative to first light source spatial location and the second light source spatial location.

5. The method of claim 4, wherein:
processing the image to estimate the camera origin location comprises computing the camera origin location based on:
a spatial location of the camera center that is known relative to the first light source spatial location and the second light source spatial location;
the first glint location; and
the second glint location.

6. The method of claim 4, wherein:
the image further includes a camera glint corresponding to a visible reflection on the surface of the eye of a light source located near the camera, at a camera glint location within the image; and
processing the image to estimate the camera center location comprises computing the camera center location based on the camera glint location.

7. The method of claim 4, wherein:
the first light source spatial location defines a first corner of an electronic display; and
the second light source spatial location defines a second corner of the electronic display;
further comprising, prior to processing the image to estimate the gaze direction, computing the constant horizontal component, the horizontal scaling factor, the constant vertical component, and the vertical scaling factor by:
obtaining, for each additional image of a plurality of additional images:
an unscaled pupil center vector in camera coordinates; and
one or more glint locations in camera coordinates; and
determining which unscaled pupil center vectors correspond to extremities of the horizontal and vertical components of a coordinate system.

8. The method of claim 7, wherein determining which unscaled pupil center vectors correspond to the extremities of the horizontal and vertical components of the coordinate system comprises:
filtering the unscaled pupil center vectors to select:
a top subset of unscaled pupil center vectors having a vertical coordinate above a top threshold;
a bottom subset of unscaled pupil center vectors having a vertical coordinate below a bottom threshold;
a left subset of unscaled pupil center vectors having a horizontal coordinate left of a left threshold; and
a right subset of unscaled pupil center vectors having a vertical coordinate right of a right threshold.

9. The method of claim 8, wherein determining which unscaled pupil center vectors correspond to the extremities of the horizontal and vertical components of the coordinate system further comprises excluding from the top, bottom, left, and right subsets one or more unscaled pupil center vectors having an outlier value of the horizontal or vertical coordinate.

10. The method of claim 8, wherein the top threshold, bottom threshold, left threshold, and right threshold each corresponds to a respective percentile value of the vertical or horizontal coordinate of the unscaled pupil center vectors.

11. The method of claim 7, wherein computing the constant vertical component and the vertical scaling factor comprises performing a linear regression between the unscaled pupil center vectors and one or more glint locations representing:
an upper edge of the coordinate system; and
a lower edge of the coordinate system.

12. The method of claim 7, wherein computing the constant horizontal component and the horizontal scaling factor comprises performing a linear regression between the unscaled pupil center vectors and one or more glint locations representing:
a left edge of the coordinate system; and
a right edge of the coordinate system.

13. The method of claim 12, wherein the unscaled pupil center vectors of the left eye are averaged with the unscaled pupil center vectors of the right eye prior to entry in the linear regression.

14. The method of claim 1, wherein the mathematical function is a linear function.

15. The method of claim 14, wherein the mathematical function is a tangent function having a substantially linear component, further comprising estimating said tangent function parameters using said linear function.

16. A device, comprising:
a display having an upper edge, a lower edge, a left edge, and a right edge;
a camera, located at a camera origin spatial location, configured to face toward an eye of a user viewing the display;
at least two light sources, each light source being located co-linearly with at least one edge of the display at a known light source spatial location relative to the camera origin spatial location;
a processor device; and
a memory storing instructions that, when executed by the processor device, cause the device to estimate a gaze direction of an eye by:
obtaining an image, the image comprising:
a pupil of the eye, the pupil being associated with a pupil center location within the image; and
a first glint reflection on a surface of the eye, the first glint reflection being associated with:
a first one of the at least two light sources; and
a first glint location within the image;
processing the image to estimate a camera origin location within the image; and
processing the image to estimate the pupil center location; and
processing the image to estimate a pupil center vector by calculating a vector, in camera coordinates, between the camera origin location and the estimated pupil center location;
processing the image to estimate the first glint location of the first glint reflection; and generating a scaled pupil center vector by applying a mathematical function having a substantially linear component to the pupil center vector to scale the pupil center vector to a coordinate system based on the camera origin location and the first glint reflection.

17. The device of claim 16, further comprising:
a camera light source located near the camera;
wherein:
the image further includes a camera glint, corresponding to a visible reflection on the surface of the eye of the camera light source, at a camera glint location within the image; and
processing the image to estimate the camera origin location comprises computing the camera origin location based on the camera glint location.

18. The device of claim 16, wherein:
the device comprises a computing device; and
the camera origin spatial location is substantially aligned with the lower edge of the display.

19. The device of claim 16, wherein:
the device comprises a head-mounted display (HMD) unit;
the display comprises a HMD display situated in front of the eye; and
the camera origin spatial location is substantially aligned with the lower edge of the display.

20. The device of claim 16, wherein:
the device comprises a vehicle;
the display of the device comprises at least a portion of a front windscreen of the vehicle; and
the camera of the device is mounted to a steering wheel of the vehicle.

21. The device of claim 16, wherein:
the device comprises a vehicle;
the display of the device comprises at least a portion of a front windscreen of the vehicle; and
the camera of the device is mounted on an interior surface of the vehicle above a steering wheel of the vehicle.

22. The device of claim 16, wherein:
the at least two light sources are infrared light sources placed behind a front surface of the display;
the camera is an infrared camera; and
the front surface of the display comprises a material that is substantially transparent to infrared light.

23. A non-transitory computer-readable medium storing instructions thereon to be executed by a processor device, the instructions, when executed, causing the processor device to perform the steps of the method of claim 1.

* * * * *